(12) United States Patent
Liu et al.

(10) Patent No.: US 11,521,020 B2
(45) Date of Patent: Dec. 6, 2022

(54) EVALUATION OF MODELING ALGORITHMS WITH CONTINUOUS OUTPUTS

(71) Applicant: EQUIFAX INC., Atlanta, GA (US)

(72) Inventors: Lefei Liu, Alpharetta, GA (US); Peter Liu, Alpharetta, GA (US); Jiawei Liu, Alpharetta, GA (US); Peter Gao, Alpharetta, GA (US); Vickey Chang, Suwanee, GA (US)

(73) Assignee: EQUIFAX INC., Atlanta, GA (US)

( * ) Notice: Subject to any disclaimer, the term of this patent is extended or adjusted under 35 U.S.C. 154(b) by 345 days.

(21) Appl. No.: 16/669,959

(22) Filed: Oct. 31, 2019

(65) Prior Publication Data

US 2020/0134387 A1   Apr. 30, 2020

Related U.S. Application Data

(60) Provisional application No. 62/753,899, filed on Oct. 31, 2018.

(51) Int. Cl.
*G06K 9/62* (2022.01)
*G06F 17/18* (2006.01)
(Continued)

(52) U.S. Cl.
CPC .......... *G06K 9/6262* (2013.01); *G06F 17/18* (2013.01); *G06K 9/6277* (2013.01); *G06N 5/003* (2013.01); *G06N 20/00* (2019.01); *G06V 10/751* (2022.01)

(58) Field of Classification Search
CPC ............... G06K 9/6262; G06K 9/6277; G06K 9/6265; G06F 17/18; G06N 5/003;
(Continued)

(56) References Cited

U.S. PATENT DOCUMENTS

| | | | |
|---|---|---|---|
| 9,928,508 B2 * | 3/2018 | Steele | G06F 21/41 |
| 2004/0073528 A1 | 4/2004 | Tang et al. | |

(Continued)

FOREIGN PATENT DOCUMENTS

| | | | | |
|---|---|---|---|---|
| WO | WO-2016164680 A2 * | 10/2016 | ............. | G06F 17/18 |
| WO | WO-2017053347 A1 * | 3/2017 | ........... | G06F 16/285 |

OTHER PUBLICATIONS

W. Kuhfeld and W. Cai, "Introducing the New ADAPTIVEREG Procedure for Adaptive Regression", SAS Global Forum 2013 (Year: 2013).*

(Continued)

*Primary Examiner* — Douglas Kay
(74) *Attorney, Agent, or Firm* — Kilpatrick Townsend & Stockton LLP

(57) ABSTRACT

Certain aspects involve evaluating modeling algorithms whose outputs can impact machine-implemented operating environments. For instance, a computing system generates, from a comparison of a set of estimated attribute values of an attribute to a set of validation attribute values of the attribute, a discretized evaluation dataset with data values in multiple categories. The computing system computes, for a modeling algorithm used to generate the estimated attribute values, an evaluation metric. The computing system provides a host computing system with access to the evaluation metric, one or more modeling outputs generated with the modeling algorithm, or both. Providing one or more of these outputs to the host computing system can facilitate modifying one or more machine-implemented operations.

15 Claims, 10 Drawing Sheets

(51) Int. Cl.
  *G06N 5/00*   (2006.01)
  *G06N 20/00*  (2019.01)
  *G06V 10/75*  (2022.01)

(58) Field of Classification Search
  CPC .......... G06N 20/00; G06N 3/08; G06N 20/20;
  G06V 10/751
  See application file for complete search history.

(56) References Cited

U.S. PATENT DOCUMENTS

| | | | |
|---|---|---|---|
| 2004/0172374 A1* | 9/2004 | Forman | G06N 20/00 706/12 |
| 2019/0147412 A1* | 5/2019 | Chiaramonte | G06Q 10/06311 705/7.13 |
| 2020/0175388 A1* | 6/2020 | Hu | G06N 5/04 |
| 2021/0241141 A1* | 8/2021 | Dugger | G06N 7/005 |

OTHER PUBLICATIONS

T.T.T. Nguyen and G. Armitage, "A Survey of Techniques for Internet Traffic Classification using Machine Learning", IEEE Communications Surveys & Tutorials, vol. 10, No. 4, Fourth Quarter 2008 (Year: 2008).*

* cited by examiner

EVALUATION OF MODELING ALGORITHMS WITH CONTINUOUS OUTPUTS

CROSS REFERENCE TO RELATED APPLICATIONS

This application claims priority to U.S. Provisional Application No. 62/753,899, filed on Oct. 31, 2018, which is hereby incorporated in its entirety by this reference.

TECHNICAL FIELD

The presently disclosed subject matter relates generally to artificial intelligence. More specifically, but not by way of limitation, this disclosure relates to systems that can evaluate and, in some cases, update modeling algorithms that generate continuous output variables and that can be used for predicting events that can impact machine-implemented operating environments.

BACKGROUND

Machine-learning algorithms and other modeling algorithms can be used to perform one or more functions (e.g., acquiring, processing, analyzing, and understanding various inputs in order to produce an output that includes numerical or symbolic information). For instance, machine-learning techniques can involve using computer-implemented models and algorithms (e.g., a convolutional neural network, a support vector machine, etc.) to simulate human decision-making. In one example, a computer system programmed with a machine-learning model can learn from training data and thereby perform a future task that involves circumstances or inputs similar to the training data. Such a computing system can be used, for example, to recognize certain individuals or objects in an image, to simulate or predict future actions by an entity based on a pattern of interactions to a given individual, etc.

SUMMARY

Certain aspects involve evaluating modeling algorithms using continuous variables for predicting events that can impact machine-implemented operating environments. For example, a computing system, such as a server system, can execute program code stored in one or more non-transitory computer-readable media. Executing the program code stored in one or more non-transitory computer-readable media can configure the computing system to access an estimated dataset having a set of estimated attribute values of an attribute that is a continuous variable and a validation dataset having a set of validation attribute values of the attribute. The estimated dataset could be generated by applying a modeling algorithm to an input dataset of predictor data samples. The set of validation attribute values can correspond to the set of estimated attribute values. Executing the program code stored in one or more non-transitory computer-readable media can also configure the computing system to generate, from a comparison of the estimated dataset and the validation dataset to an outcome of interest, a discretized evaluation dataset with data values in multiple categories. Executing the program code stored in one or more non-transitory computer-readable media can also configure the computing system to compute, for the modeling algorithm, an evaluation metric based on a comparison of data values from different categories of the discretized evaluation dataset, the evaluation metric indicating an accuracy of the modeling algorithm. A host computing system can be provided with access to the evaluation metric, a modeling output generated with the modeling algorithm, or both.

Further features of the disclosed design, and the advantages offered thereby, are explained in greater detail hereinafter with reference to specific aspects illustrated in the accompanying drawings, wherein like elements are indicated by like reference designators.

BRIEF DESCRIPTION OF THE DRAWINGS

The accompanying drawings, which are incorporated and constitute a part of this specification, illustrate various aspects and aspects of the disclosed aspects and, together with the description, serve to explain the principles of the disclosed aspects.

DETAILED DESCRIPTION

Figure 1:
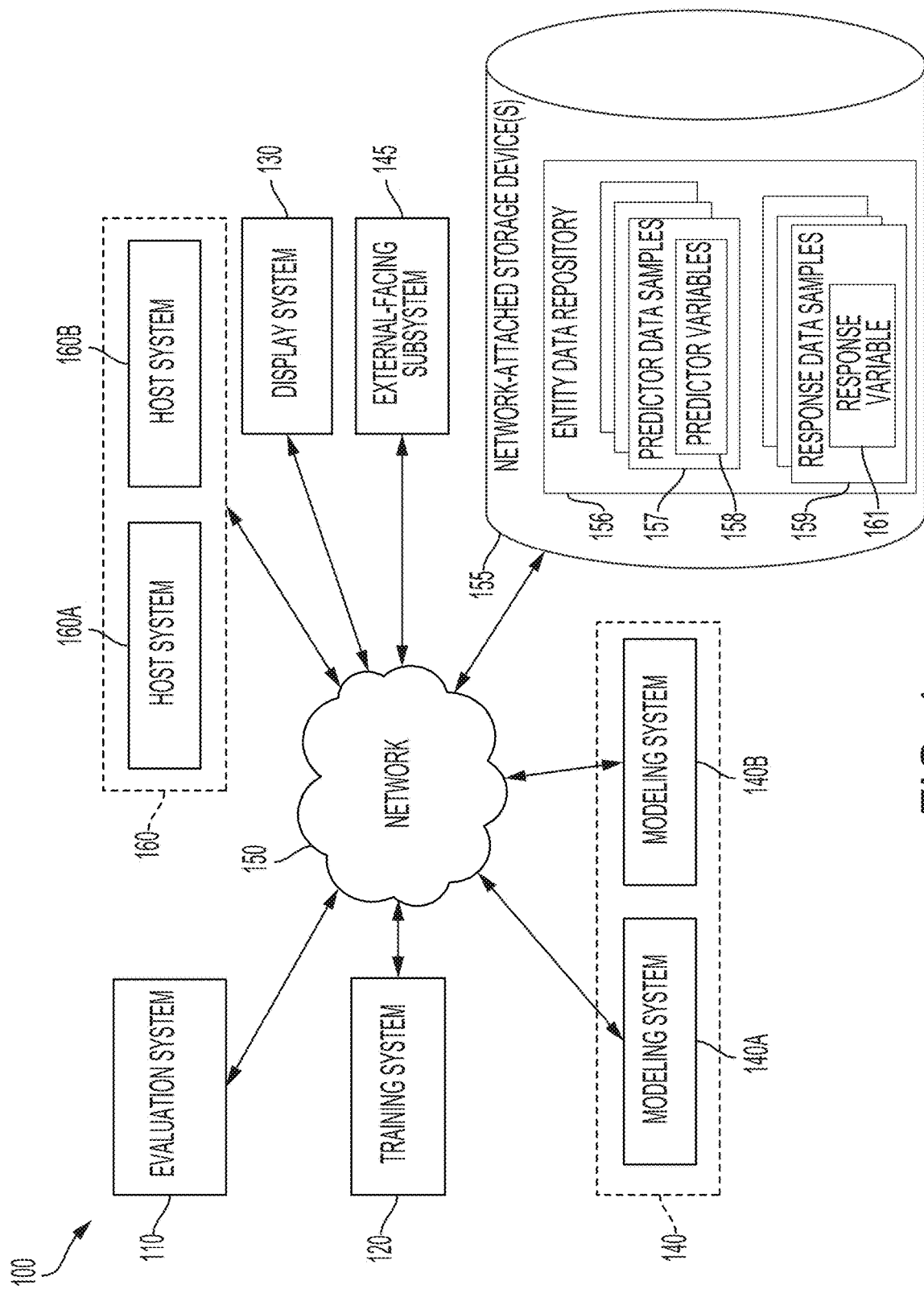
FIG. 1 depicts an example of a system for evaluating the accuracy of models that can be used to control or modify operations of machine-implemented environments, according to certain aspects of the present disclosure.

This disclosure involves evaluating modeling algorithms, which can output or otherwise use continuous variables, for predicting events that can impact machine-implemented operating environments. Modeling algorithms include, for example, algorithms that involve models such as neural networks, support vector machines, logistic regression, etc. A modeling algorithm can be trained to predict, for example, a certain outcome based on various input attributes. In some aspects, predictions generated by a modeling algorithm can be used to modify a machine-implemented operating environment to account for the occurrence of the target event.

Since predictions generated by a modeling algorithm may impact other systems, an evaluation metric for the modeling algorithm could be used to assess the modeling algorithm's performance. Certain aspects involve an evaluation system computing such an evaluation metric. For example, the evaluation system could access an estimated dataset having a set of estimated attribute values of at least one attribute that is a continuous variable, and could also access a validation dataset having a set of validation attribute values of the attribute. The values in the estimated dataset can be generated by applying a modeling algorithm to an input dataset of the predictor data samples. The validation attribute values can correspond to the estimated attribute values. For instance, validation attribute values can be known values of a certain output attribute (e.g., predictive outputs) that are associated with certain known values of an input attribute set (e.g., one or more input attributes), and the estimated attribute values of the output attribute that are computed by applying the modeling algorithm to the same or similar values of the input attribute set.

Continuing with this example, the evaluation system can generate, from a comparison of the estimated dataset and the validation dataset to an outcome of interest, a discretized evaluation dataset with data values in multiple categories (e.g., false positives for the output of interest, true negatives for the output of interest, etc.). The evaluation system can compute computing an evaluation metric based on a comparison of data values from different categories of the discretized evaluation dataset. The evaluation metric can indicate an accuracy of the modeling algorithm. The evaluation system can provide a host system with access to the evaluation metric itself, access to a modeling output generated with the modeling algorithm that has been evaluated, or both. In some aspect, the host system can be used to alter one or more machine-implemented environments using the modeling algorithm (or its modeling output) if the evaluation metric indicates that the modeling algorithm is sufficiently accurate.

Certain aspects can include operations and data structures with respect to neural networks or other models that improve how computing systems service analytical queries or otherwise update machine-implemented operating environments. For instance, a particular set of rules are employed in the training of predictive models that are implemented via program code. This particular set of rules allow, for example, different models to be evaluated so that a higher-performing model can be selected, can allow a particular model to be updated so that the model's performance is improved, or both. Employment of these rules in the training or use of these computer-implemented models can allow for more effective prediction of certain events or characteristics, which can in turn facilitate the adaptation of an operating environment based on that prediction (e.g., modifying an industrial environment based on predictions of hardware failures, modifying an interactive computing environment based on risk assessments derived from the predicted timing of adverse events, etc.). Thus, certain aspects can effect improvements to machine-implemented operating environments that are adaptable based on the outputs of one or more modeling systems.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Reference will now be made in detail to example aspects of the disclosed technology, examples of which are illustrated in the accompanying drawings and disclosed herein. Wherever convenient, the same references numbers will be used throughout the drawings to refer to the same or like parts.

FIG. 1 illustrates an example of a system 100 consistent with certain disclosed aspects. In one aspect, as shown, system 100 may include an evaluation system 110, a training system 120, a display system 130, a modeling system 140, a network 150, and a host system 160. In some aspects, the evaluation system 110, may receive an estimated dataset from the modeling system 140 via the network 150. According to some aspects, the evaluation system 110 may also receive a validation dataset from the training system 120 via the network 150. In some aspects, the evaluation system 110 may discretize the estimated and validation datasets and may generate an evaluation metric by comparing the discretized datasets. According to some aspects, the evaluation system 110 may transmit the evaluation metric to the display system 130 via network 150, and display system 130 may generate a graphical user interface configured to visually depict the evaluation metric.

The evaluation system 110 may be configured to receive datasets from one or more sources. Examples of these sources include one or more training systems 120, one or more modeling systems 140, or some combination thereof. In one aspect, evaluation system 110 may receive an outcome of interest, wherein an outcome of interest represents an outcome of the modeling system that is to be evaluated.

The training system 120 may be a system (e.g., a computer system) configured to transmit and receive information associated with training a prediction model, such as known, or training, data. The training system 120 may include one or more components that perform processes consistent with the disclosed aspects.

For example, the training system 120 may include one or more computers (e.g., servers, database systems, etc.) that are configured to execute software instructions programmed to perform aspects of the disclosed aspects. The training system 120 can include one or more processing devices that execute program code stored on a non-transitory computer-readable medium. The program code can include a model-development engine. Program code for a modeling algorithm can be generated or updated by the model-development engine using predictor data samples and response data samples.

The model-development engine can generate or update the program code for a modeling algorithm. The program code for a modeling algorithm can include program code that is executable by one or more processing devices. The program code can include a set of modeling algorithms. A particular modeling algorithm can include one or more functions for accessing or transforming input attribute data, such as a set of attribute values for a particular individual or other entity, and one or more functions for computing an output attribute, such as a characteristic of an individual or entity, the probability of a target event, etc. Such functions can include, for example, applying a trained machine-learning model or other suitable model to the attribute values. The program code for computing the probability can include model structures (e.g., layers in a neural network), model parameter values (e.g., weights applied to nodes of a neural network, etc.).

The training system 120 may transmit, to a modeling system 140, program code for a modeling algorithm that has been generated or updated with the model-development engine, or otherwise provide the modeling system 140 with access to the program code for the modeling algorithm. The modeling system 140 can execute the program code for a modeling algorithm and thereby compute a modeled output attribute, a target event probability, etc.

The display system 130 may be a system (e.g., a computer system) configured to transmit and receive information associated with displaying graphics. The display system 130 may include one or more components that perform processes consistent with the disclosed aspects. For example, the display system 130 may include one or more computers (e.g., servers, database systems, etc.) that are configured to execute software instructions programmed to perform aspects of the disclosed aspects.

The modeling system 140 may include one or more physical or logical separate modeling systems 140A, 140B, etc. The modeling system 140 may be configured to receive, process and transmit information associated with generating and executing predictive models for estimating continuous target variables. The modeling system 140 may include components that enable it to perform processes consistent with the disclosed aspects.

The host system 160 may be configured to receive, process, display, and transmit information associated with generating, executing, and interpreting, or evaluating, predictive models for estimating continuous target variables. The host system 160 may include components that enable it to perform processes consistent with the disclosed aspects. The host system 160 may include multiple separate host systems 160A, 160B, etc.

A host system 160 can include any suitable computing device or group of devices, such as (but not limited to) a server or a set of servers that collectively operate as a server system. Examples of host systems 160 include a mainframe computer, a grid computing system, or other computing system. In one example, a host system 160 may be a host server system that includes one or more servers that control an operating environment. Examples of an operating environment include (but are not limited to) a website or other interactive computing environment, an industrial or manufacturing environment, a set of medical equipment, a power-delivery network, etc.

In some aspects, the host system 160 may be a third-party system with respect to one or more of the evaluation system 110, the training system 120, the display system 130, and the modeling system 140. For example, one or more of the evaluation system 110, the training system 120, the display system 130, and the modeling system 140 could include (or be communicatively coupled to) one or more external-facing subsystems 145 for interacting with a host system 160. Each external-facing subsystem 145 for a computing system (e.g., one or more of the evaluation system 110, the training system 120, the display system 130, and the modeling system 140) can include, for example, one or more computing devices that provide a physical or logical subnetwork (sometimes referred to as a "demilitarized zone" or a "perimeter network") that expose certain online functions of the computing system to an untrusted network, such as the Internet or another public data network. Each external-facing subsystem 145 can include, for example, a firewall device that is communicatively coupled to one or more computing devices (e.g., computing devices for implementing one or more of the evaluation system 110, the training system 120, the display system 130, and the modeling system 140), thereby forming a private data network. A firewall device of an external-facing subsystem 145 can create a secured part of a computing system that includes various devices in communication via a private data network. In some aspects, such a private data network can include at least the evaluation system 110, the training system 120, and the modeling system 140, with the host system 160 being a third-party system (e.g., a system that communicates with the private data network via an external-facing subsystem 145 included in the private data network). In additional or alternative aspects, the private data network can also include one or more host systems 160.

Facilitating communication between components of the system 100, the network 150 may be of any suitable type, including individual connections via the Internet such as cellular or WiFi networks. In some aspects, the network 150 may connect terminals, services, and mobile devices using direct connections such as radio-frequency identification (RFID), near-field communication (NFC), Bluetooth™, low-energy Bluetooth™ (BLE), WiFi™, Ethernet, ZigBee™, ambient backscatter communications (ABC) protocols, USB, WAN, or LAN. Because the information transmitted may be personal or confidential, security concerns may dictate one or more of these types of connections be encrypted or otherwise secured. In some aspects, however, the information being transmitted may be less personal, and therefore the network connections may be selected for convenience over security.

The system 100 may also include one or more network-attached storage devices 155. The network-attached storage devices 155 can include memory devices for storing an entity data repository 156. In some aspects, the network-attached storage devices 155 can also store any intermediate or final data generated by one or more components of the system 100.

The entity data repository 156 can store predictor data samples 157 and response data samples 159. The predictor data samples 157 can include values of one or more predictor variables 158 (e.g., input attributes of a modeling algorithm). The response data samples 159 can include values of one or more response variables 161 (e.g., output attributes of a modeling algorithm). In some aspects, the external-facing subsystem 145 can prevent one or more host systems 160 from accessing the entity data repository 156 via a public data network. The predictor data samples 157 and response data samples 159 can be provided by one or more host systems 160 or by end-user devices, generated by one or more host systems 160 or end-user devices, or otherwise communicated within a system 100 via a public data network.

For example, a large number of observations can be generated by electronic transactions, where a given observation includes one or more predictor variables (or data from which a predictor variable can be computed or otherwise derived). A given observation can also include data for a response variable or data from which a response variable value can be derived. Examples of predictor variables can include data associated with an entity, where the data describes behavioral or physical traits of the entity, observations with respect to the entity, prior actions or transactions involving the entity (e.g., information that can be obtained from credit files or records, financial records, consumer records, or other data about the activities or characteristics of the entity), or any other traits that may be used to predict the response associated with the entity. In some aspects, samples of predictor variables, response variables, or both can be obtained from credit files, financial records, consumer records, etc.

Network-attached storage devices 155 may also store a variety of different types of data organized in a variety of different ways and from a variety of different sources. For example, network-attached storage devices 155 may include storage other than primary storage located within the evaluation system 110 that is directly accessible by processors located therein. Network-attached storage devices 155 may include secondary, tertiary, or auxiliary storage, such as large hard drives, servers, virtual memory, among other types. Storage devices may include portable or non-portable storage devices, optical storage devices, and various other mediums capable of storing or containing data. A machine-readable storage medium or computer-readable storage medium may include a non-transitory medium in which data can be stored and that does not include carrier waves or transitory electronic signals. Examples of a non-transitory medium may include, for example, a magnetic disk or tape, optical storage media such as compact disk or digital versatile disk, flash memory, memory or memory devices.

In some aspects, the system 100 can be used for interpreting and evaluating the predictive accuracy of models for estimating continuous target variables. For example, an evaluation system 110 may receive an estimated dataset (e.g., set of predicted incomes from an income estimation model) generated by a prediction model used by a modeling algorithm, which is executed by a modeling system 140. The evaluation system 110 may also receive a validation dataset (e.g., set of known incomes used as a training set for a prediction model) from a training system 120. The evaluation system 110 may also determine an outcome of interest (e.g., accuracy of a model at predicting incomes above $65,000). The evaluation system 110 may then discretize the datasets based on the outcome of interest (e.g., turn the continuous variable data into a discrete evaluation dataset, which is usable for answering the question of whether each data point is in compliance with the outcome of interest). The evaluation system 110 may use the discretized data to generate an evaluation metric. The evaluation metric can be, for example, a measure of the predictive performance of a modeling system 140 for the outcome of interest.

Although certain aspects of the present disclosure are discussed with reference to income models, these are merely examples. In light of the present disclosure, one of ordinary skill will recognize that models for predicting various continuous target variables (e.g., wage income, total income, revenue, payment, investment, balance, stock, bonds, annuities, interest rate, stack growth, dividends, ability to pay, spending, business assets etc.) may be within the scope of the present invention.

Computing System Example

Figure 2:
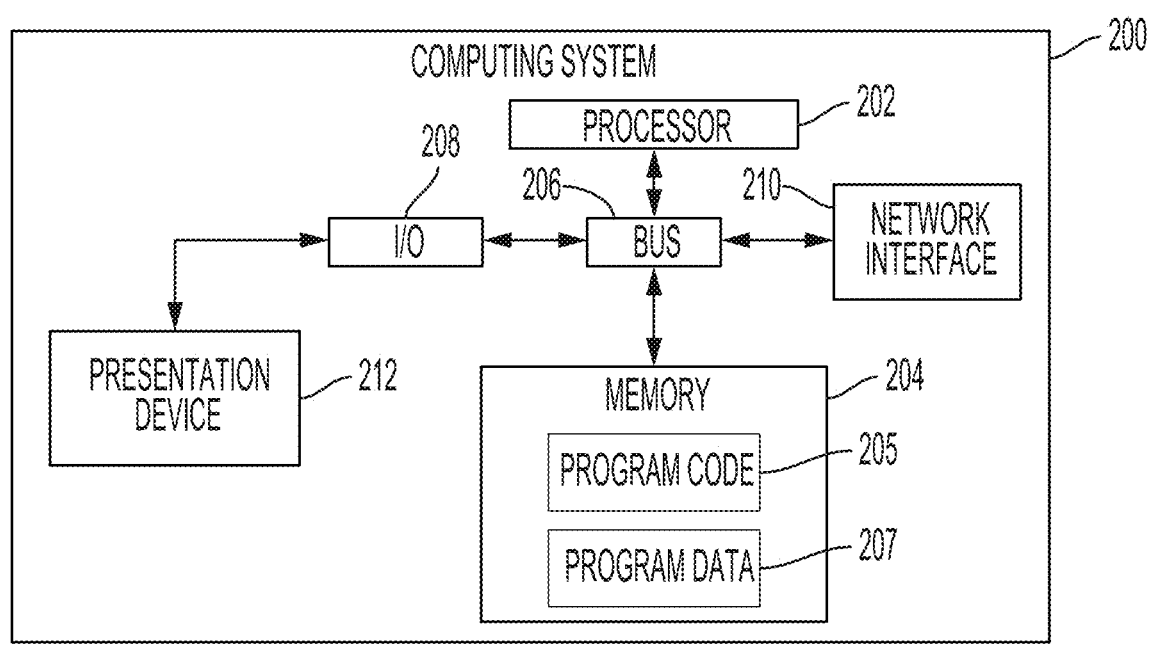
FIG. 2 depicts an example of a computing system suitable for implementing aspects of the techniques and technologies presented herein.

Any suitable computing system or group of computing systems can be used to perform the operations described herein. For example, FIG. 2 is a block diagram depicting an example of a computing system 200 that can be used to implement one or more of the systems depicted in FIG. 1. One or more of the evaluation system 110, the training system 120, the display system 130, and the modeling system 140 can have a structure and components that are similar to those described with respect to the computing system 200. The example of the computing system 200 can include various devices for communicating with other devices in the computing environment described with respect to FIG. 1. The computing system 200 can include various devices for performing one or more of the operations described above.

The computing system 200 can include a processor 202, which includes one or more devices or hardware components communicatively coupled to a memory 204. The processor 202 executes computer-executable program code 205 stored in the memory 204, accesses program data 207 stored in the memory 204, or both. Examples of a processor 202 include a microprocessor, an application-specific integrated circuit, a field-programmable gate array, or any other suitable processing device. The processor 202 can include any number of processing devices, including one. The processor 202 can include or communicate with a memory 204. The memory 204 stores program code that, when executed by the processor 202, causes the processor to perform the operations described in this disclosure.

The memory 204 can include any suitable non-transitory computer-readable medium. The computer-readable medium can include any electronic, optical, magnetic, or other storage device capable of providing a processor with computer-readable program code or other program code. Non-limiting examples of a computer-readable medium include a magnetic disk, memory chip, optical storage, flash memory, storage class memory, a CD-ROM, DVD, ROM, RAM, an ASIC, magnetic tape or other magnetic storage, or any other medium from which a computer processor can read and execute program code. The program code may include processor-specific program code generated by a compiler or an interpreter from code written in any suitable computer-programming language. Examples of suitable programming language include C, C++, C #, Visual Basic, Java, Python, Perl, JavaScript, ActionScript, etc.

The computing system 200 can execute program code 205. The program code 205 may be stored in any suitable computer-readable medium and may be executed on any suitable processing device. For example, as depicted in FIG. 2, the program code for the model-development engine can reside in the memory 204 at the computing system 200. Executing the program code 205 can configure the processor 202 to perform one or more of the operations described herein.

Program code 205 stored in a memory 204 may include machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing or receiving information, data, arguments, parameters, or memory contents. Information, arguments, parameters, data, etc. may be passed, forwarded, or transmitted via any suitable means including memory sharing, message passing, token passing, network transmission, among others. Examples of the program code 205 include one or more of the applications, engines, or sets of program code described herein, such as program code for training or configuring a model, program code for implementing a modeling algorithm, an interactive computing environment presented to a user device, etc.

Examples of program data 207 stored in a memory 204 may include one or more databases, one or more other data structures, datasets, etc. For instance, if a memory 204 is a network-attached storage device 155, program data 207 can include predictor data samples 157, response data samples 159, etc. If a memory 204 is a storage device used by a host system 160, program data 207 can include input attribute data, data obtained via interactions with end-user devices, etc.

The computing system 200 may also include a number of external or internal devices such as input or output devices. For example, the computing system 200 is shown with an input/output interface 208 that can receive input from input devices or provide output to output devices. A bus 206 can also be included in the computing system 200. The bus 206 can communicatively couple one or more components of the computing system 200.

In some aspects, the computing system 200 can include one or more output devices. One example of an output device is the network interface device 210 depicted in FIG. 2. A network interface device 210 can include any device or group of devices suitable for establishing a wired or wireless data connection to one or more data networks (e.g., a network 150, a private data network, etc.). Non-limiting examples of the network interface device 210 include an Ethernet network adapter, a modem, etc. Another example of an output device is the presentation device 212 depicted in FIG. 2. A presentation device 212 can include any device or group of devices suitable for providing visual, auditory, or other suitable sensory output. Non-limiting examples of the presentation device 212 include a touchscreen, a monitor, a speaker, a separate mobile computing device, etc.

Examples of Evaluating Modeling Algorithms

Figure 3:
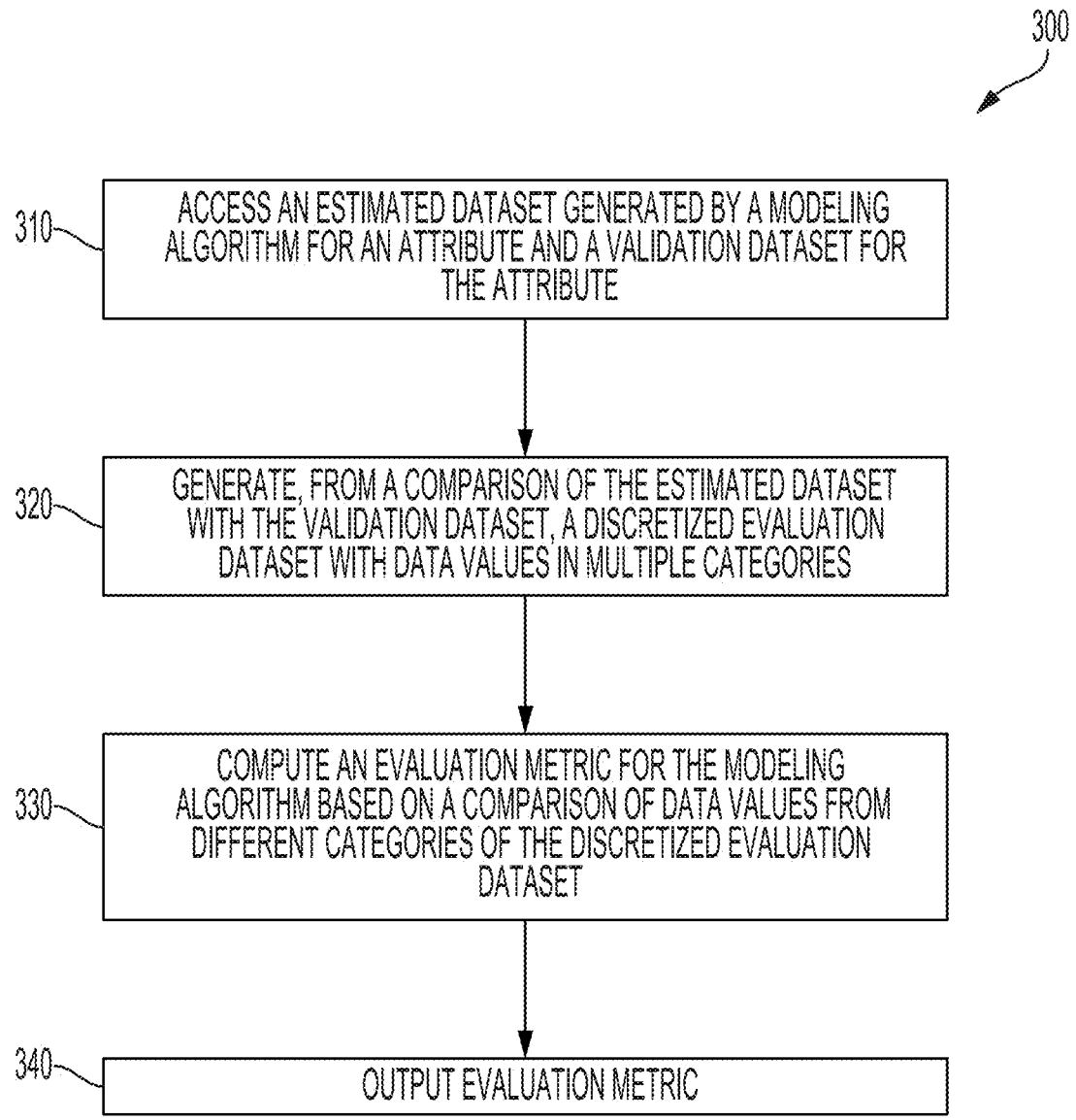
FIG. 3 depicts an example of a process for evaluating the accuracy of models that can be used to control or modify operations of machine-implemented environments, according to certain aspects of the present disclosure.

FIG. 3 depicts an example a process 300 that can be used to generate an evaluation metric for assessing the performance of a modeling system. For illustrative purposes, the process 300 is described with reference to implementations described with respect to various examples depicted in FIGS. 1, 2, and 4-10. Other implementations, however, are possible. The operations in FIG. 3 are implemented in program code that is executed by one or more computing devices. In some aspects, one or more operations shown in FIG. 3 may be omitted or performed in a different order. Similarly, additional operations not shown in FIG. 3 may be performed.

Block 310 involves accessing an estimated dataset for one or more attributes and a validation dataset for the one or more attributes. Block 310 can be implemented by an evaluation system 110. The values of an attribute in the estimated dataset can be generated by executing, with one or more modeling systems 140, a modeling algorithm. An attribute that is included in both the estimated dataset and the validation dataset can be a variable having a set of values that are continuous. In a simplified example, such an attribute can be an income of a consumer, where a modeling algorithm is used to compute estimated values of consumers' incomes (i.e., values of the attribute in the estimated dataset). The validation dataset can include a set of validation attribute values corresponding to the set of estimated attribute values. In the simplified example involving income, the validation dataset can include known values of consumers' incomes.

The evaluation system 110 may obtain or otherwise receive the validation dataset from one or more training systems 120. For instance, a training system 120 can be used to train or otherwise configure a modeling algorithm. The training system 120 can do so using a validation dataset, which includes values of various input attributes of entities (e.g., education, location, industry, etc. of consumers) and known values of one or more output attributes (e.g., income level). The modeling algorithm can be applied to an input dataset (i.e., values of input attributes, such as a set of predictor data samples) and can compute one or more estimated attribute values of an output attribute (e.g., an estimated income level). The training system 120 can train or configure the modeling algorithm modifying one or more parameters of the modeling algorithm such that the estimated attribute values of an output attribute match (either exactly or approximately) the known values of the output attribute.

The output attribute in the datasets can include information for an outcome of interest. The outcome of interest can be a feature of the estimated dataset that is of interest to a user of the evaluation system 110. In some aspects, the evaluation system 110 can identify the outcome of interest by analyzing received datasets and determining the outcome of interest based on such an analysis. In additional or alternative aspects, the evaluation system 110 can identify the outcome of interest by receiving input data (e.g., one or more inputs from a user or host system) and identifying the outcome of interest from the input data.

Block 320 involves generating, from a comparison of the estimated dataset and the validation dataset with an outcome of interest, a discretized evaluation dataset with data values in multiple categories. Block 320 can be implemented by the evaluation system 110.

In some aspects, generating the discretized evaluation dataset can include identifying at least a first category and a second category. The first category for the discretized evaluation dataset can indicate a match between estimated attribute values and validation attribute values with respect to the outcome of interest (e.g., a true positive, a true negative, etc.). The second category for the discretized evaluation dataset can indicate a mismatch between estimated attribute values and validation attribute values with respect to the outcome of interest (e.g., a false positive, a false negative, etc.). The evaluation system 110 can determine, from the comparison of the estimated dataset and the validation dataset to the outcome of interest, a number of matches in the first category and a number of mismatches in the second category. The evaluation system 110 can also output the discretized evaluation dataset having the first category with the number of matches and the second category with the number of mismatches. Outputting the discretized evaluation dataset can include, for example, providing the discretized evaluation dataset to other operations in the process 300, causing a display system 130 to display data about the discretized evaluation dataset, or some combination thereof.

In some aspects, an outcome of interest can be an output attribute having a value greater than a threshold attribute value. In these aspects, a match can occur if both an estimated attribute value and a corresponding validation attribute value are greater than the threshold attribute value. Similarly, a mismatch can occur if one of an estimated attribute value and a corresponding validation attribute value is greater than the threshold attribute value and the other of the estimated attribute value and the corresponding validation attribute value is less than the threshold attribute value.

In additional or alternative aspects, an outcome of interest can be an output attribute having a value less than a threshold attribute value. In these aspects, a match can occur if both an estimated attribute value and a corresponding validation attribute value are less than the threshold attribute value. Similarly, a mismatch can occur if one of an estimated attribute value and a corresponding validation attribute value is greater than the threshold attribute value and the other of the estimated attribute value and the corresponding validation attribute value is less than the threshold attribute value.

In some aspects, the evaluation system 110 can use one or more classification matrices to generate data values in different categories of a discretized evaluation dataset. A classification matrix is a data structure that classifies estimated attribute values, which can be output data points generated by a modeling algorithm, into one or more accuracy categories. Examples of accuracy categories include true positive, false positive, false negative, and false positive. The evaluation system 110 may use such a classification matrix to sort estimated attribute values from the modeling system 140 into categories. The evaluation system 110 can perform the sorting based on comparing estimated attribute values for the outcome of interest to validation attribute values for the outcome of interest. In this manner, a set of continuous values for an income variable is used to compute a set of discrete categorical data (e.g., a set of categories and a respective number of instances of each category).

TABLE 1

Table 1 is an example of a classification matrix.

| | True value ≥ $x_{threshold}$ | True value < $x_{threshold}$ |
|---|---|---|
| Estimated value ≥ $x_{threshold}$ | True Positives A | False Positives B |
| Estimated value < $x_{threshold}$ | False Negatives D | True Negatives D |

TABLE 2

Table 2 is another example of a classification matrix.

| | True value < $x_{threshold}$ | True value ≥ $x_{threshold}$ |
|---|---|---|
| Estimated value < $x_{threshold}$ | True Positives E | False Positives F |
| Estimated value ≥ $x_{threshold}$ | False Negatives G | True Negatives H |

The following illustrative example uses an income attribute as the outcome of interest. In this example, the evaluation system 110 can compare predicted income values (i.e., estimated attribute values computed by the modeling system 140) and known income values (i.e., validation attribute values from the training system 120) to a threshold attribute value.

For instance, an outcome of interest represented by the classification matrix in Table 1 is whether an attribute x (e.g., a person's income) is above a threshold. In this example, the evaluation system 110 can evaluate an outcome of interest in which an attribute x (e.g., a person's income) is compared to a threshold attribute value. The threshold attribute value can be specific to the outcome of interest, and can be specified via input data received from a user device or a host system. Based on this comparison, the evaluation system 110 can classify a specific estimated attribute value (e.g., predicted income of a single individual) of the modeling system 140 as a true positive, false positive, false negative, or a true negative. A discretized evaluation dataset includes the set of categories in the classification matrix and the numbers of instances in each category, such as 200 instances of a true positive, 350 instances of a false positive, etc.

As shown in Table 1, an estimated attribute value of the modeling system 140 may be classified as a true positive, which is depicted in quadrant A. In Table 1, a true positive can occur if, for example, both the estimated attribute value of the modeling system 140 and the corresponding validation attribute value from the training system 120 are at or above the threshold attribute value, depicted in Table 1 as $x_{threshold}$. In a simplified example involving a person's income, the threshold attribute value $x_{threshold}$ could be $60,000, the modeling system 140 could predict a user's income to be $61,000, and the user's actual income (which is obtained from the training system 120) could be $65,000. In this example, the evaluation system 110 can classify the prediction as a true positive, since both the estimated attribute value (i.e., income of $61,000) and the validation attribute value (i.e., income of $65,000) are above the threshold attribute value.

Additionally, as shown in the example from Table 1, an estimated attribute value of the modeling system 140 may be classified as a false positive, which is depicted in quadrant B. In Table 1, a false positive can occur if, for example, the estimated attribute value of the modeling system 140 is at or above the threshold attribute value and the corresponding validation attribute values point from the training system 120 is below the threshold attribute value. In the example involving a person's income, the threshold attribute value $x_{threshold}$ could be $60,000, the modeling system 140 could predict a user's income to be $61,000, and the user's actual income (which is obtained from the training system 120) could be $55,000. In this example, the evaluation system 110 can classify the prediction as a false positive, since the estimated attribute value (i.e., income of $61,000) is above the threshold attribute value and the validation attribute value (i.e., income of $55,000) is below the threshold attribute value.

Additionally, as shown in the example from Table 1, an estimated attribute value of the modeling system 140 may be classified as a false negative, which is depicted in quadrant C. In Table 1, a false negative can occur if, for example, the estimated attribute value of the modeling system 140 is below the threshold attribute value and the corresponding validation attribute value from the training system 120 is at or above the threshold attribute value. In the example involving a person's income, the threshold attribute value $x_{threshold}$ could be $60,000, the modeling system 140 could predict a user's income to be $58,000, and the user's actual income (which is obtained from the training system 120) could be $65,000. In this example, the evaluation system 110 can classify the prediction as a false positive, since the estimated attribute value (i.e., income of $58,000) is below the threshold attribute value and the validation attribute value (i.e., income of $65,000) above the threshold attribute value.

Additionally, as shown in the example from Table 1, an estimated attribute value of the modeling system 140 may be classified as a true negative, which is depicted in quadrant D, when both the estimated attribute value of the modeling system 140 and the corresponding validation attribute value from the training system 120 are below the threshold attribute value. In the example involving a person's income, the threshold attribute value $x_{threshold}$ could be $60,000, the modeling system 140 could predict a user's income to be $59,000 and the user's actual income (which is obtained from the training system 120) could be $55,000. In this example, the evaluation system 110 can classify the prediction as a true negative, since both the estimated attribute value (i.e., income of $59,000) and the validation attribute value (i.e., income of $55,000) are below the threshold attribute value.

Additionally or alternatively, an outcome of interest represented by the classification matrix in Table 2 is whether an attribute x (e.g., a person's income) is below a threshold. In this example, an estimated attribute value of the modeling system 140 may be classified as a true positive, which is depicted in quadrant E. This classification can occur if, for example, both the estimated attribute value of the modeling system 140 and the corresponding validation attribute value from the training system 120 are below the threshold attribute value, depicted in Table 2 as $x_{threshold}$. In the example involving a person's income, the threshold attribute value could be $60,000, the modeling system 140 could predict a user's income to be $59,000, and the user's actual income (which is obtained from the training system 120) could be $55,000. In this example, the evaluation system 110 can classify the prediction as a true positive, since both the estimated attribute value (i.e., income of $59,000) and the validation attribute value (i.e., income of $55,000) are below the threshold attribute value.

Additionally, as shown in the example from Table 2, an estimated attribute value computed by the modeling system 140 may be classified as a false positive, which is depicted in quadrant F. This classification can occur if, for example, the estimated attribute value of the modeling system 140 is below the threshold attribute value while the corresponding validation attribute value from the training system 120 is at or above the threshold attribute value. In the example involving a person's income, the threshold attribute value could be $60,000, the modeling system 140 could predict a user's income to be $55,000 and the user's actual income (which is obtained from the training system 120) could be $62,000. In this example, the evaluation system 110 can classify the prediction as a false positive, since the estimated attribute value (i.e., income of $55,000) is below the threshold attribute value and the validation attribute value (i.e., income of $62,000) above the threshold attribute value.

Additionally, as shown in the example from Table 2, an estimated attribute value computed by the modeling system 140 may be classified as a false negative, which is depicted in quadrant G. This classification can occur if, for example, the estimated attribute value of the modeling system 140 is at or above the threshold attribute value and the corresponding validation attribute value from the training system 120 is below the threshold attribute value. In the example involving a person's income, the threshold attribute value could be $60,000, the modeling system 140 could predict a user's income to be $65,000 and the user's actual income (which is obtained from the training system 120) could be $50,000. In this example, the evaluation system 110 can classify the prediction as a false negative, since the estimated attribute value (i.e., income of $65,000) is above the threshold attribute value and the validation attribute value (i.e., income of $50,000) is below the threshold attribute value.

Additionally, as shown in the example from Table 2, an estimated attribute value computed by the modeling system 140 may be classified as a true negative, which is depicted in quadrant H. This classification can occur if, for example, both the estimated attribute value of the modeling system 140 and the corresponding validation attribute value from the training system 120 are at or above the threshold attribute value. In the example involving a person's income, the threshold attribute value could be $60,000, the modeling system 140 could predict a user's income to be $128,000 and the user's actual income (which is obtained from the training system 120) could be $125,000. In this example, the evaluation system 110 can classify the prediction as a true negative. In this example, the evaluation system 110 can classify the prediction as a true negative, since both the estimated attribute value (i.e., income of $128,000) and the validation attribute value (i.e., income of $125,000) are above the threshold attribute value.

Returning to process 300, block 330 involves computing an evaluation metric for the modeling algorithm based on a comparison of data values from different categories of the discretized evaluation dataset. Block 330 can be performed by the evaluation system 110. An evaluation metric may be a measure of the predictive performance of the modeling system 140 for an outcome of interest, such as an accuracy of a modeling algorithm performed by the modeling system 140. For instance, the evaluation metric can be a measure of the predictive performance of the modeling algorithm for the outcome of interest. In the examples above, computing the evaluation metric could include computing a percentage of matches (e.g., true positives, true negatives, or both true positives and true negatives) within a sum of the matches in the first category and the mismatches in the second category (e.g., false positives, false negatives, or both false positives and false negatives). Examples of the evaluation metric include a one-tail accuracy (upwards), a one-tail accuracy (downwards), and a classification accuracy.

In some aspects, the evaluation system 110 may determine a one-tail accuracy metric. A one-tail accuracy metric is a metric indicating the predictive performance of a modeling system 140 in a single direction. In various aspects, this direction can be upwards (e.g., if the outcome of interest relates to a greater than or greater than or equal to measurement) or downwards (e.g., if the outcome of interest relates to a less than or less than or equal to measurement).

In some aspects, the evaluation system 110 can compute one or more evaluation metrics for the estimated attribute values of the modeling system 140 that have been classified using a classification matrix. For instance, the evaluation system 110 may calculate a one-tail upwards accuracy metric incorporating the following equation:

$$\text{One Tail Accuracy (Upwards)} = \frac{A}{A+B} = \frac{TP}{TP+FP}$$

In this example, variables A and B are the same as variables A and B from Table 1. Here, the one-tail accuracy (upwards) metric is calculated by dividing the number of true positive results by the sum of the true positives and the false positives. As a result, the evaluation metric is (or can be derived from) a percentage value indicating how accurate the modeling system 140 is if the resulting prediction is greater than or greater than or equal to a specified outcome of interest.

Figure 4:
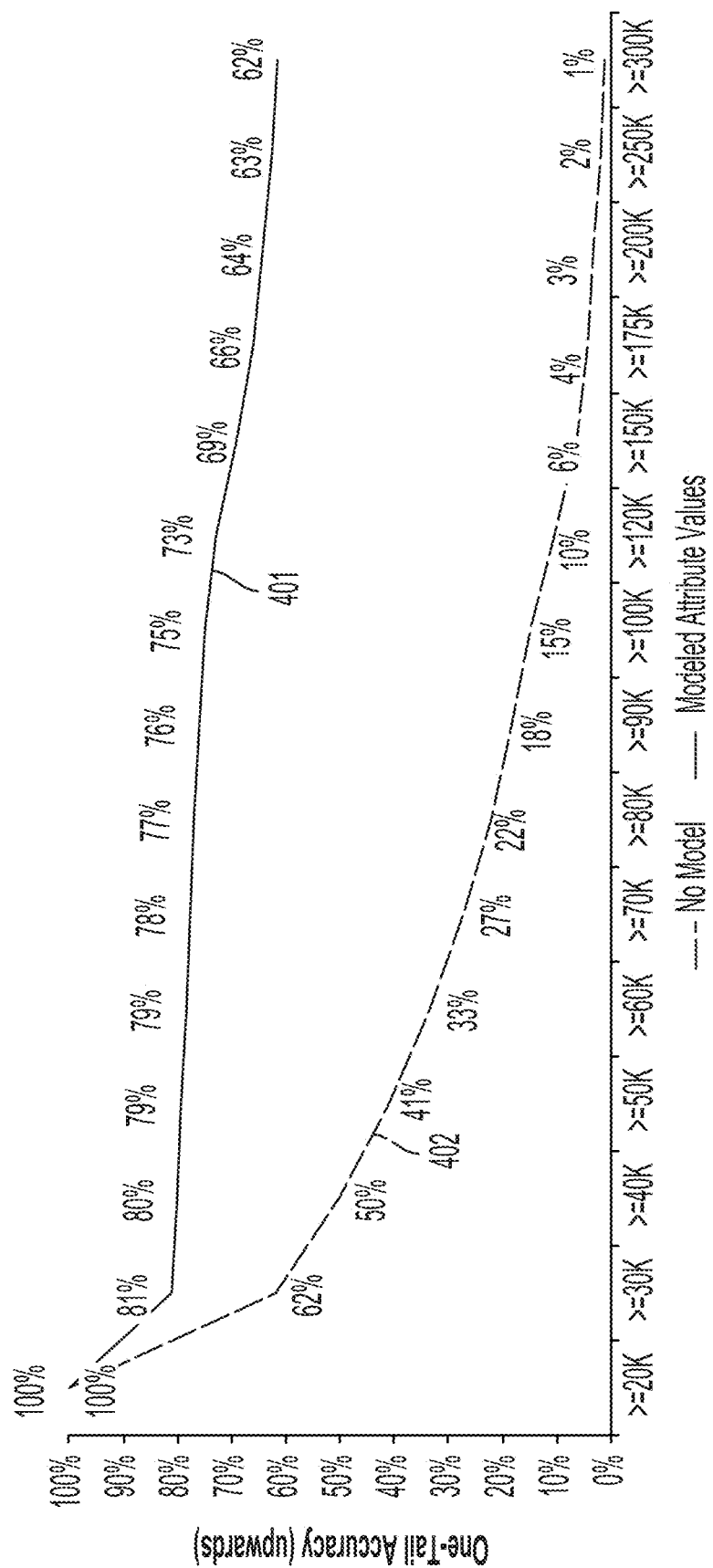
FIG. 4 depicts examples of graphs of one-tail accuracy (upwards) metrics computed using the process of FIG. 3, according to certain aspects of the present disclosure.
Figure 5:
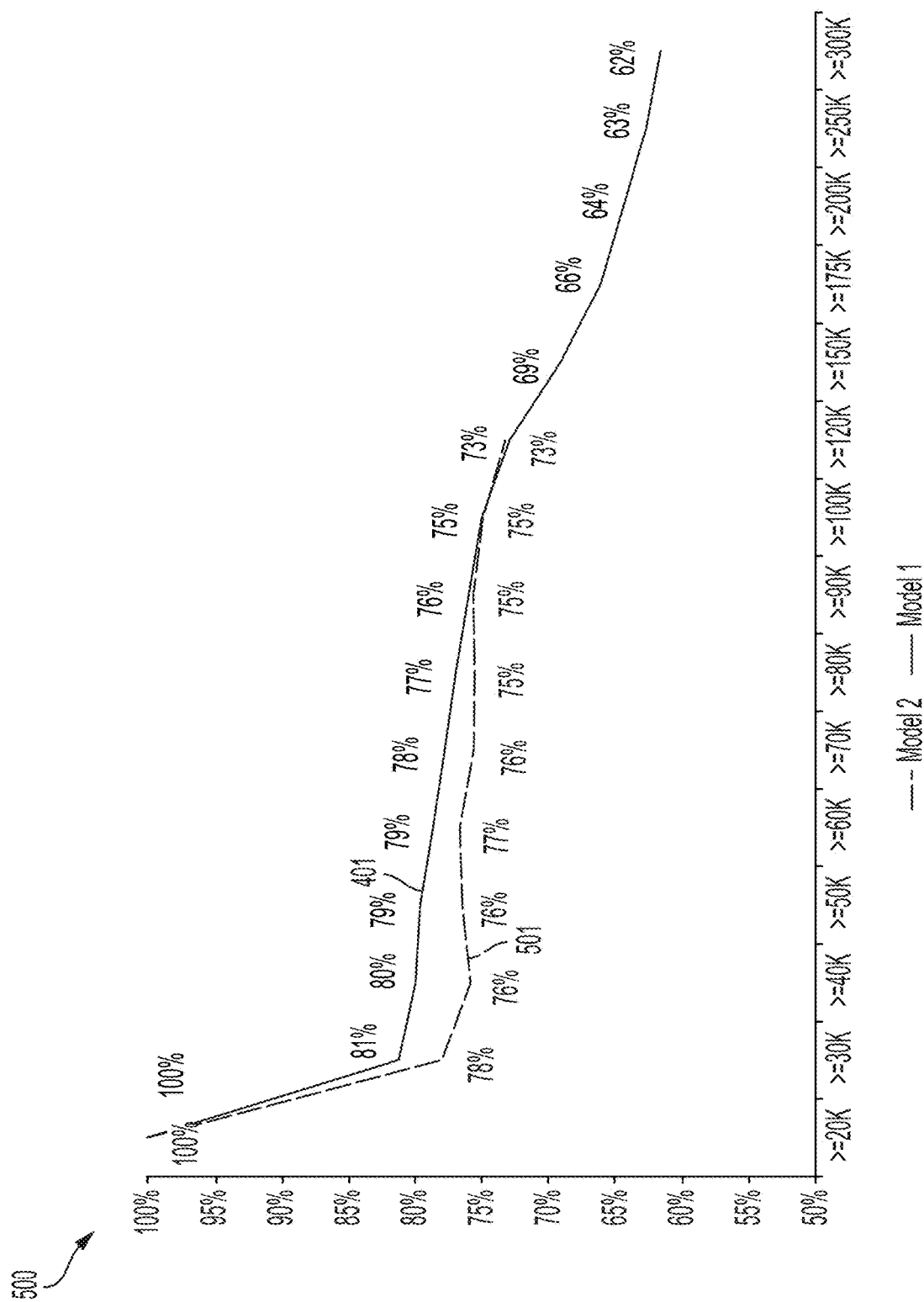
FIG. 5 depicts additional examples of graphs of one-tail accuracy (downwards) metrics computed using the process of FIG. 3, according to certain aspects of the present disclosure.

FIGS. 4 and 5 depict graphs of one-tail accuracy (upwards) metrics calculated across multiple outcomes and interest and multiple models. The y-axis of FIGS. 4 and 5 charts the percentage accuracy calculated using the previously described one-tail accuracy (upwards) metric. The x-axis charts specific data points in a range of outcomes of interest. In the example depicted in FIGS. 4 and 5, the outcomes of interest are the percentage accuracy of the estimated incomes greater than or equal to a range of income values. In particular, FIGS. 4 and 5 depict percentage accuracies (i.e., along the y-axis) of estimated incomes for income thresholds of $20K, $30K, etc. Accordingly, the x-axis depicts the range of income values.

FIG. 4 depicts a model evaluation graph 401 that is generated by calculating, with the evaluation system 110, the one-tail accuracy (upwards) metric at each income value in the range of income values. The model evaluation graph 401 could be, for example, the accuracy of different estimated income values that are computed with a modeling algorithm that is executed by a modeling system 104, as indicated by the "modeled attribute values" label in the legend. FIG. 4 also depicts a normalized graph 402 that is generated based on average income distribution across a population. The normalized graph 402 could be, for example, the accuracy of different estimated income values that are estimated without using a modeling algorithm of a modeling system 140, as indicated by the "no model" label in the legend.

FIG. 5 depicts an example of using evaluation metrics to compare two different models. FIG. 5 depicts the model evaluation graph 401, as which is also depicted in FIG. 4, for a first modeling algorithm (labeled "Model 1" in the legend). FIG. 5 also depicts an additional model evaluation graph 501. The model evaluation graph 501 includes the one-tail accuracy (upwards) metrics for a different modeling algorithm (labeled "Model 2" in the legend). Such a visual display allows for a visual evaluation of the performance of one or more prediction models used by one or more modeling algorithms executed by one or more modeling systems 140.

In additional or alternative aspects, the evaluation system 110 may calculate a one-tail downwards accuracy metric. For instance, the evaluation system 110 could compute a one-tail downwards accuracy metric using the following equation:

$$\text{One Tail Accuracy (Downwards)} = \frac{E}{E+F} = \frac{TP}{TP+FP}$$

In this example, variables E and F are the same as variables E and F from Table 2. Here, the evaluation system 110 computes the one-tail accuracy (downwards) metric by dividing the number of true positive results by the sum of the true positives and the false positives. As a result, the evaluation metric is (or can be derived from) a percentage value indicating how accurate the modeling system 140 is when the resulting prediction is greater than or greater than or equal to a specified outcome of interest.

Figure 6:
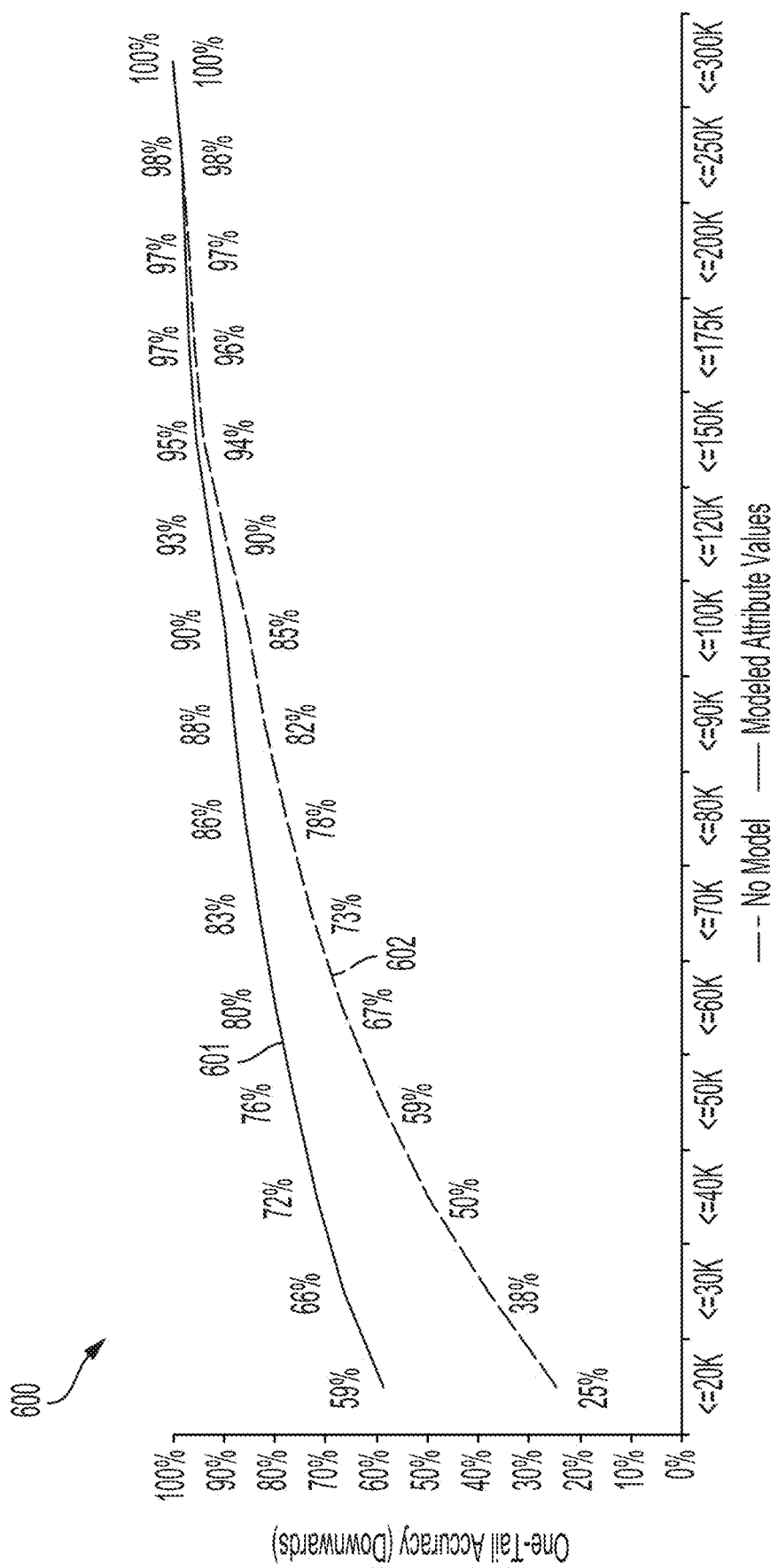
FIG. 6 depicts examples of graphs of one-tail accuracy (downwards) metrics computed using the process of FIG. 3, according to certain aspects of the present disclosure.
Figure 7:
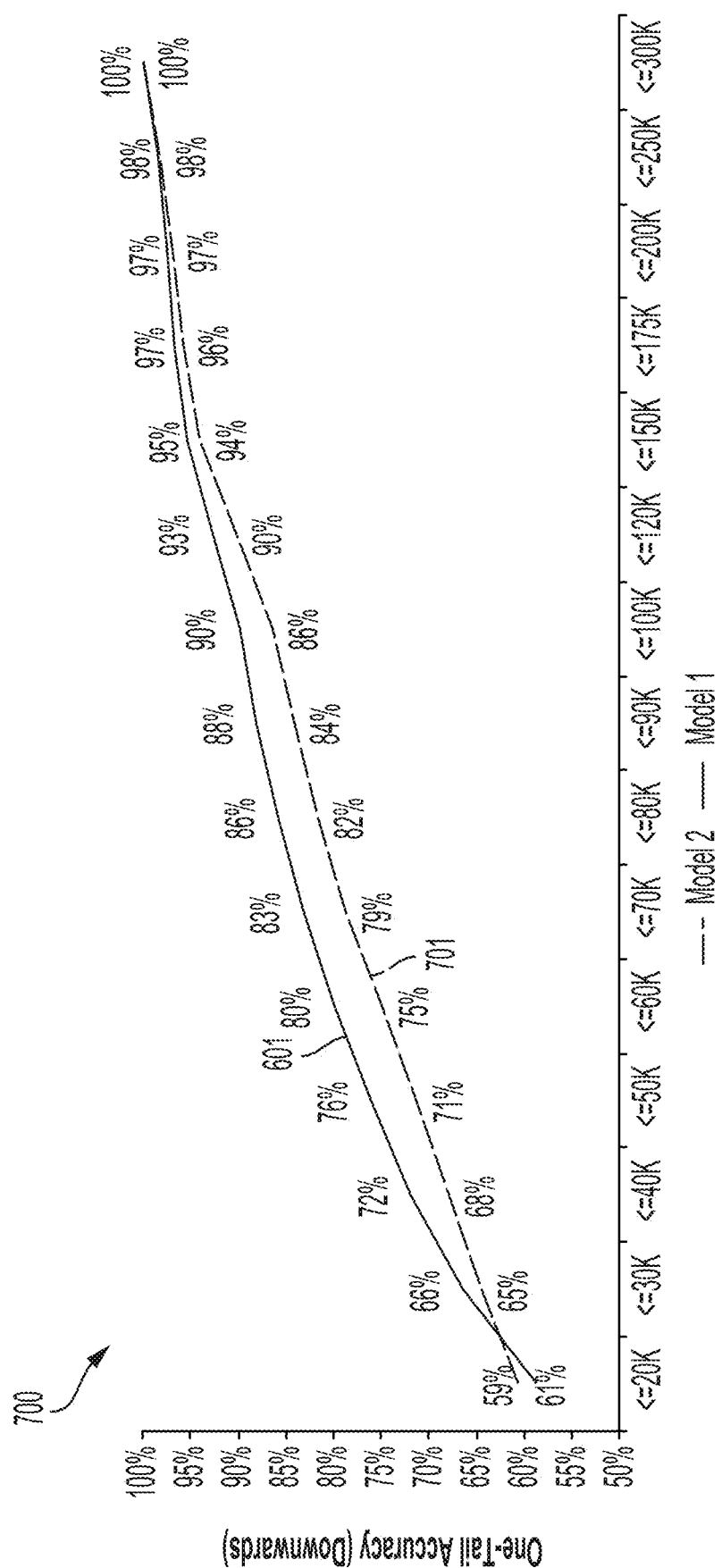
FIG. 7 depicts additional examples of graphs of one-tail accuracy (downwards) metrics computed using the process of FIG. 3, according to certain aspects of the present disclosure.

FIGS. 6 and 7 depict graphs of one-tail accuracy (downwards) metrics calculated across multiple outcomes and interest and multiple models. The x and y axes of the graphs in FIGS. 6 and 7 are the same as the axes in FIGS. 4 and 5.

FIG. 6 depicts a model evaluation graph 601. The model evaluation graph 601 could be, for example, the accuracy of different estimated income values that are computed with a modeling algorithm that is executed by a modeling system 104, as indicated by the "modeled attribute values" label in the legend. The model evaluation graph 601 includes values that are generated by calculating, with the evaluation system 110, the one-tail accuracy (downwards) metric at each income value in the range of income values. FIG. 6 also depicts a normalized graph 602 that is generated based on average income distribution across a population. The normalized graph 602 could be, for example, the accuracy of different estimated income values that are estimated without using a modeling algorithm of a modeling system 140, as indicated by the "no model" label in the legend.

FIG. 7 depicts an example of using evaluation metrics to compare two different models. FIG. 7 depicts the model evaluation graph 601, which is also depicted in FIG. 6, for a first modeling algorithm (labeled "Model 1" in the legend). FIG. 7 also depicts an additional model evaluation graph 701. The model evaluation graph 601 includes the one-tail accuracy (downwards) metrics for a different modeling algorithm (labeled "Model 2" in the legend). Such a visual display allows for a visual evaluation of the performance of one or more prediction models used by one or more modeling algorithms executed by one or more modeling systems 140.

In additional or alternative aspects, the evaluation system 110 may calculate a classification accuracy metric. For instance, a classification accuracy metric may be computed using the following equation:

$$\text{Classification Accuracy} = \frac{A+D}{A+B+C+D} = \frac{E+H}{E+F+G+H} = \frac{TP+TN}{TP+FP+FN+TN}$$

In this example, variables E and F are the same as variables E and F from Table 2. Here, the classification accuracy metric is calculated by dividing the number of true positive results by the sum of the true positives and the false positives. As a result, the evaluation metric is (or can be derived from) a percentage value indicating how accurate the modeling system 140 is if the resulting prediction is greater than or equal to a specified outcome of interest.

Figure 8:
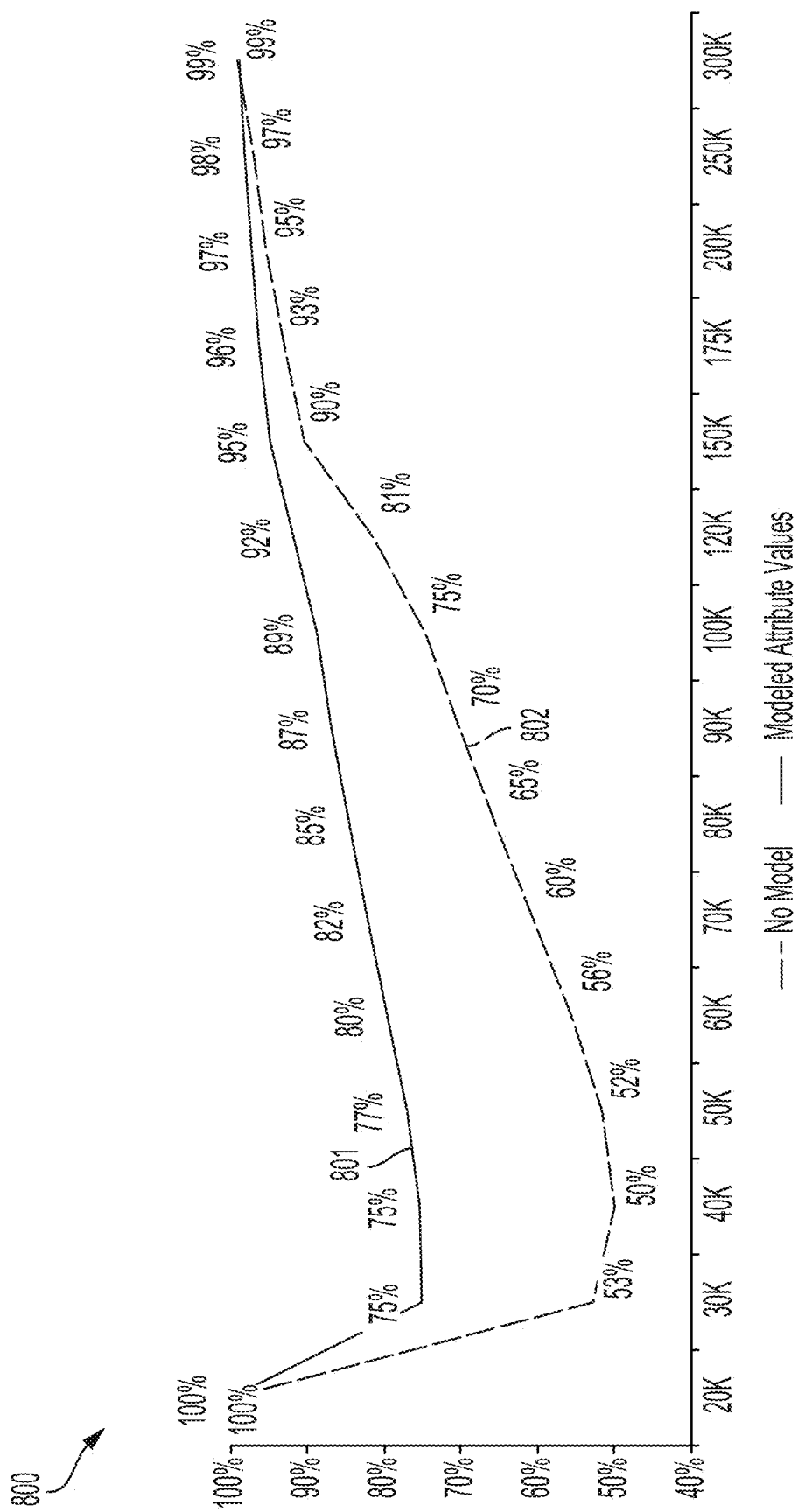
FIG. 8 depicts examples of graphs of classification accuracy metrics computed using the process of FIG. 3, according to certain aspects of the present disclosure.
Figure 9:
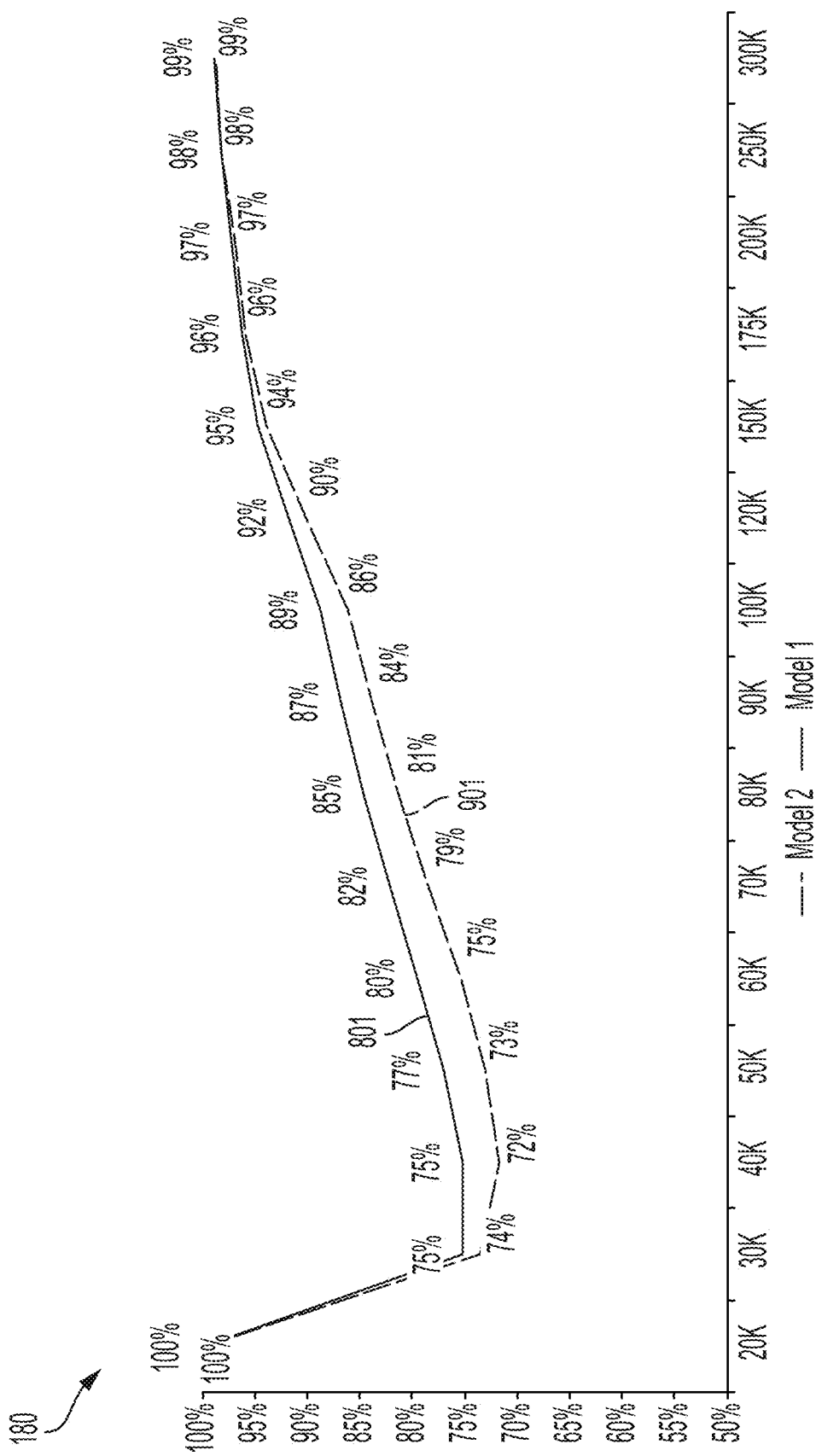
FIG. 9 depicts additional examples of classification accuracy metrics computed using the process of FIG. 3, according to certain aspects of the present disclosure.
Figure 10:
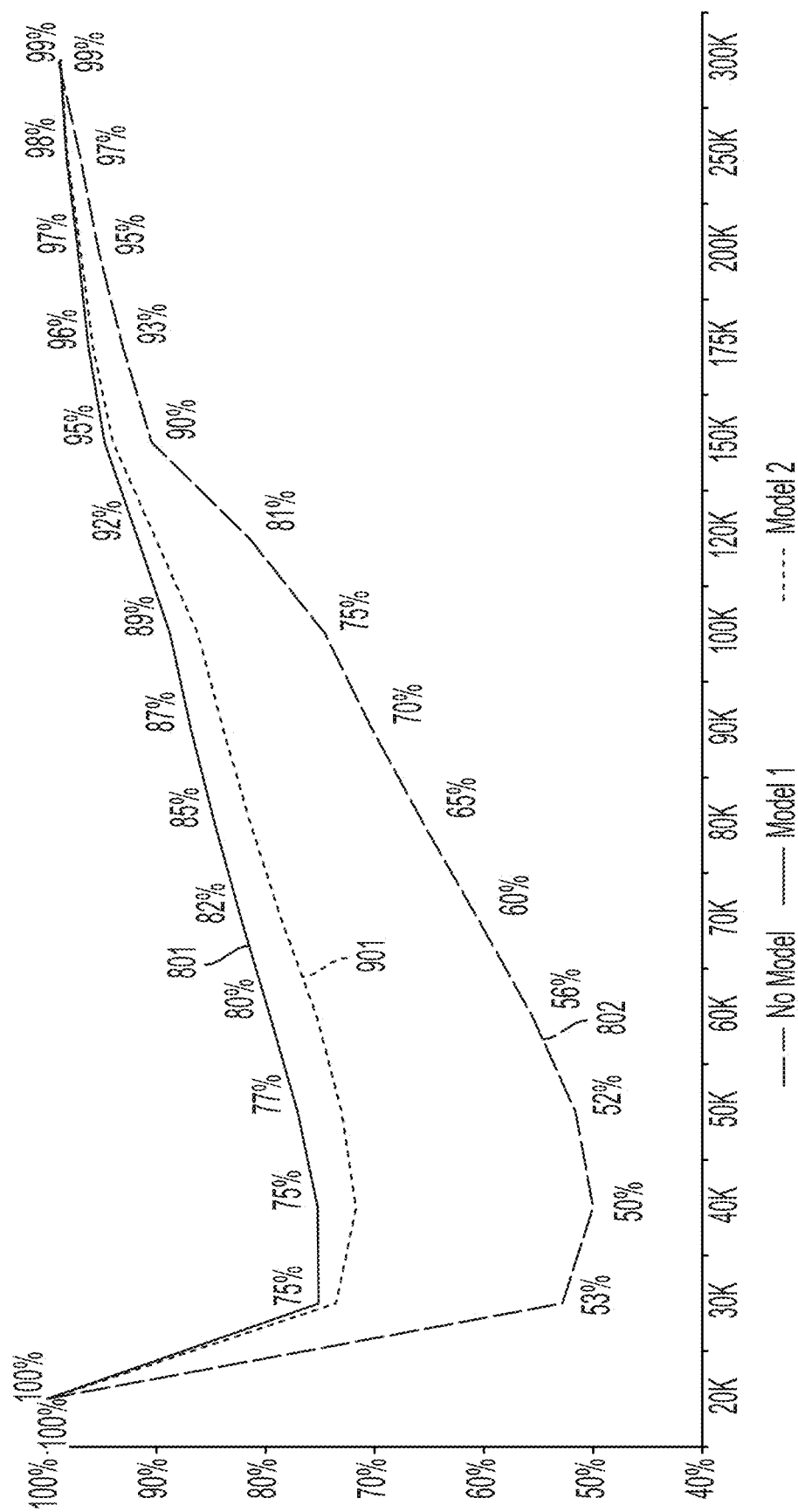
FIG. 10 depicts additional examples of graphs of classification accuracy metrics computed using the process of FIG. 3, according to certain aspects of the present disclosure.

FIGS. 8-10 depict graphs of classification accuracy metrics calculated across multiple outcomes and interest and multiple models. The x and y axes of the graphs in FIGS. 8-10 are the same as the axes in FIGS. 4 and 5.

FIG. 8 depicts a model evaluation graph 801. The model evaluation graph 801 could be, for example, the accuracy of different estimated income values that are computed with a modeling algorithm that is executed by a modeling system 104, as indicated by the "modeled attribute values" label in the legend. The model evaluation graph 801 includes values that are generated by calculating, with the evaluation system 110, the classification accuracy metric at each income value in the range of income values. FIG. 8 also depicts a normalized graph 802 that is generated based on average income distribution across a population. The normalized graph 802 could be, for example, the accuracy of different estimated income values that are estimated without using a modeling algorithm of a modeling system 140, as indicated by the "no model" label in the legend.

FIG. 9 depicts an example of using evaluation metrics to compare two different models. FIG. 9 depicts the model evaluation graph 801, which is also depicted in FIG. 8, for a first modeling algorithm (labeled "Model 1" in the legend). FIG. 9 also depicts an additional model evaluation graph 901. The model evaluation graph 801 includes the classification accuracy metrics for a different modeling algorithm (labeled "Model 2" in the legend). Such a visual display allows for a visual evaluation of the performance of one or more prediction models used by one or more modeling algorithms executed by one or more modeling systems 140.

FIG. 10 depicts the model evaluation graph 1001, the normalized graph 1002, and the additional model evaluation graph 1101. Such a visual display allows for a visual evaluation of the performance of one or more prediction models used by one or more modeling algorithms executed by one or more modeling systems 140.

Returning to FIG. 3, block 340 of the process 300 involves outputting the evaluation metric. Outputting the program code can include, for example, storing the evaluation metric in a non-transitory computer-readable medium accessible by a computing system, transmitting the program code to the computing system via one or more data networks, or some combination thereof.

In some aspects, the evaluation system 110 can output the evaluation metric to one or more of the training system 120 and the modeling system 140. Outputting the evaluation metric to one or more of the training system 120 and the modeling system 140 can cause the training system 120, the modeling system 140, or both to update program code used to implement a model (e.g., a predictive model, a classification model, etc.). For instance, if the evaluation metric indicates a model performance that is less than a threshold, then the program code used to implement a model can be updated to improve the evaluation metric (e.g., by performing additional training for the model).

In additional or alternative aspects, the evaluation system 110 can output the evaluation metric to a host system 160. The host system 160 can verify the performance of the modeling system 140 based on the evaluation metric.

In some aspects, outputting the evaluation metric can include generating a graphic of the evaluation metric. The graphic can be configured to visually depict the evaluation metric, such as one or more of the graphs depicted in FIGS. 4-10. In one example, a computing system (e.g., evaluation system 110) may transmit for display (e.g., transmit through network 150 to display system 130) the graphic of the evaluation metric. In examples in which the resultant output would be a graphic depicting an evaluation metric calculated with reference to a single outcome of interest (e.g., incomes above $50,000), the present disclosure includes aspects wherein the method from FIG. 3 would be repeated over a range of outcomes of interest for a single prediction model resulting in an output graphic similar to FIGS. 4, 6, and 8. Additionally, the present disclosure includes aspects wherein the method from FIG. 3 would be repeated over a range of outcomes of interest for multiple prediction models resulting in an output graphic similar to FIGS. 5, 7, 9, and 10.

In some aspects, an evaluation metric computed with the evaluation system 110 can be used for evaluating the performance of predictive models with continuous target variables more effectively than prior solutions. For instance, prior systems may use an average absolute error as an accuracy measure of predictive models with continuous target variables. But an average absolute error measure may be dominated by heavy tails of an error distribution, which can create such large error measures that model performance appears to be worse than is actually the case. Similar problems arise when prior systems apply the average absolute percent error as a performance measure. Similarly, a Windowed Percent Error, which is based on percent errors within a percentage window (e.g., windows of 10%, 20%, 30%, 40%, 50% and even higher) may also fail to account for certain uses of predictive models.

Examples of Modifying Host System Operations

In some aspects, outputting the evaluation metric at block 340 of the process 300 can cause a host system 160 can modify a host system operation based on the performance of the modeling system 140. For instance, the host system 160 can be used to modify a host system operations based on a modeling output from the modeling system 140 if the modeling system 140 has modified a model to improve an evaluation metric, if a host system 160 has verified the performance of a modeling system 140 based on the evaluation metric, or some combination thereof. Examples of a modeling output include a set of output attribute values (e.g., a predicted value such as income), a predictive output generated from the output values (e.g., a risk assessment score generated with the output attribute values), or some combination thereof. In this manner, the modeling outputs of a modeling system 140, whose performance has been verified using an evaluation metric, can be used to modify the operation of different types of machine-implemented systems within a given operating environment.

In some aspects, a modeling output includes or otherwise indicates a risk of failure of a hardware component within a set of machinery or a malfunction associated with the hardware component. For instance, a modeling system 140 can compute an output attribute that is an estimated time until the failure or malfunction occurs. If the evaluation metric indicates that the model used by the modeling system 140 is sufficiently accurate, the host system 160 can output a recommendation. The recommendation can be outputted to an end-user device, such as a laptop or mobile device used to monitor a manufacturing or medical system, a diagnostic computing device included in an industrial setting, etc. The recommendation can include the estimated time until the malfunction or failure of the hardware component, a recommendation to replace the hardware component, or some combination thereof. The operating environment can be modified by performing maintenance, repairs, or replacement with respect to the affected hardware component.

In additional or alternative aspects, a modeling output indicates a risk level associated with a target entity that is described by or otherwise associated with input attribute data used by the modeling system 140. The host system 160 can be used to modify one or more host system operations based on an evaluation metric being used to verify or improve the performance of the modeling system 140. Modifying the host system operation can include causing the host system 160 or another computing system to control access to one or more interactive computing environments by a target entity associated with the input attribute data.

For example, the host system 160, or another computing system that is communicatively coupled to the host system 160, can include one or more processing devices that execute instructions providing an interactive computing environment accessible to end-user devices. Examples of the interactive computing environment include a mobile application specific to a particular host system 160, a web-based application accessible via mobile device, etc. In some aspects, the executable instructions for the interactive computing environment can include instructions that provide one or more graphical interfaces. The graphical interfaces are used by an end-user device to access various functions of the interactive computing environment. For instance, the interactive computing environment may transmit data to and receive data from an end-user device to shift between different states of interactive computing environment, where the different states allow one or more electronics transactions between the end-user device and the host system 160 (or other computing system) to be performed. If a risk level is sufficiently low (e.g., is less than a user-specified threshold), the host system 160 (or other computing system) can provide an end-user device associated with the target entity with access to a permitted function of the interactive computing environment. If a risk level is too high (e.g., exceeds a user-specified threshold), the host system 160 (or other computing system) can prevent an end-user device associated with the target entity from accessing a restricted function of the interactive computing environment.

The following discussion involves, for illustrative purposes, a simplified example of an interactive computing environment implemented through a host system 160 to provide access to various online functions. In this example, a user of an end-user device can engage in an electronic transaction with a host system 160 via an interactive computing environment. An electronic transaction between the end-user device and the host system 160 can include, for example, the end-user device being used to query a set of sensitive or other controlled data, access online financial services provided via the interactive computing environment, submit an online credit card application or other digital application to the host system 160 via the interactive computing environment, operating an electronic tool within an interactive computing environment provided by a host system 160 (e.g., a content-modification feature, an application-processing feature, etc.), or perform some other electronic operation within a computing environment.

For instance, a website or other interactive computing environment provided by a financial institution's host system 160 can include electronic functions for obtaining one or more financial services, such as loan application and management tools, credit card application and transaction management workflows, electronic fund transfers, etc. An end-user device can be used to request access to the interactive computing environment provided by the host system 160, which can selectively grant or deny access to various electronic functions.

Based on the request, the host system 160 can collect data associated with the customer and provide the collected data to a modeling system 140, which can execute a modeling algorithm. Executing the modeling algorithm can cause the modeling system 140 to compute a risk indicator (e.g., an income level, a risk assessment score, a predicted time of occurrence for the target event, etc.) and provide the risk indicator to the host system 160. The host system 160 can use the risk indicator to instruct another device, such as a web server within the same computing environment as the host system 160 or an independent, third-party computing system in communication with the host system 160. The instructions can indicate whether to grant the access request of the end-user device to certain features of the interactive computing environment.

For instance, if a model output (or a risk indicator derived from the model output) indicates that a target entity is associated with a sufficient likelihood of a particular risk, an end-user device used by the target entity can be prevented from accessing certain features of an interactive computing environment. The system controlling the interactive computing environment (e.g., a host system 160, a web server, or some combination thereof) can prevent, based on the threshold level of risk, the end-user device from advancing a transaction within the interactive computing environment. Preventing the end-user device from advancing the transaction can include, for example, sending a control signal to a web server hosting an online platform, where the control signal instructs the web server to deny access to one or more functions of the interactive computing environment (e.g., functions available to authorized users of the platform).

Additionally or alternatively, modifying the host system operation based on the computed time of the target can include causing a system that controls an interactive computing environment (e.g., a host system 160, a web server, or some combination thereof) to modify the functionality of an online interface provided to an end-user device associated with the target entity. For instance, the host system 160 can use a model output generated by a modeling system 140 to implement a modification to an interface of an interactive computing environment presented at an end-user device. In this example, the end-user device is associated with a particular entity whose input attribute data is used to compute the model output. If the model output indicates that a target event for a target entity will occur in a given time period or that a target entity belongs to a certain category, the host system 160 (or a third-party system with which the host system 160 communicates) could rearrange the layout of an online interface so that features or content associated with a target event's occurrence or a category are presented more prominently (e.g., by presenting online products or services targeted to the risk level or user segment), features or content associated with different risk levels or applicability to other segments are hidden or presented less prominently, or some combination thereof.

In various aspects, the host system 160 or a third-party system performs these modifications automatically based on an analysis of the model output (alone or in combination with other data about the entity), manually based on user inputs that occur subsequent to computing the model output, or some combination thereof. In some aspects, modifying one or more interface elements is performed in real time, i.e., during a session in which an end-user device accesses or attempts to access an interactive computing environment. For instance, an online platform may include different modes, in which a first type of interactive user experience (e.g., placement of menu functions, hiding or displaying content, etc.) is presented to a first type of user group associated with a first risk level and a second type of interactive user experience is presented to a second type of user group associated with a different risk level. If, during a session, a model output is computed that indicates that a user of the end-user device belongs to the second group, the online platform could switch to the second mode.

In some aspects, modifying the online interface or other features of an interactive computing environment can be used to control communications between an end-user device and a system hosting an online environment (e.g., a host system 160). For instance, a model output generated by a modeling system 140, which has an evaluation metric indicating an acceptable model performance, could indicate that an end-user device or a user thereof is associated with a certain risk level. The system hosting an online environment can require, based on the determined risk level, that certain types of interactions with an online interface be performed by the end-user device as a condition for the end-user device to be provided with access to certain features of an interactive computing environment. In one example, the online interface can be modified to prompt for certain types of authentication data (e.g., a password, a biometric, etc.) to be inputted at the end-user device before allowing the end-user device to access certain tools within the interactive computing environment. In another example, the online interface can be modified to prompt for certain types of transaction data (e.g., payment information and a specific payment amount authorized by a user, acceptance of certain conditions displayed via the interface) to be inputted at the end-user device before allowing the end-user device to access certain portions of the interactive computing environment, such as tools available to paying customers. In another example, the online interface can be modified to prompt for certain types of authentication data (e.g., a password, a biometric, etc.) to be inputted at the end-user device before allowing the end-user device to access certain secured datasets via the interactive computing environment.

Example of Using a Neural Network for Modeling Algorithm

In some aspects, a model used in a modeling algorithm can be a neural network model. A neural network can be represented as one or more hidden layers of interconnected nodes that can exchange data between one another. The layers may be considered hidden because they may not be directly observable in the normal functioning of the neural network.

A neural network can be trained in any suitable manner. For instance, the connections between the nodes can have numeric weights that can be tuned based on experience. Such tuning can make neural networks adaptive and capable of "learning." Tuning the numeric weights can involve adjusting or modifying the numeric weights to increase the accuracy of a risk indicator, prediction of entity behavior, or other response variable provided by the neural network. Additionally or alternatively, a neural network model can be trained by iteratively adjusting the predictor variables represented by the neural network, the number of nodes in the neural network, or the number of hidden layers in the neural network. Adjusting the predictor variables can include eliminating the predictor variable from the neural network. Adjusting the number of nodes in the neural network can include adding or removing a node from a hidden layer in the neural network. Adjusting the number of hidden layers in the neural network can include adding or removing a hidden layer in the neural network.

In some aspects, training a neural network model for each time bin includes iteratively adjusting the structure of the neural network (e.g., the number of nodes in the neural network, number of layers in the neural network, connections between layers, etc.) such that a monotonic relationship exists between each of the predictor variables and the risk indicator, prediction of entity behavior, or other response variable. Examples of a monotonic relationship between a predictor variable and a response variable include a relationship in which a value of the response variable increases as the value of the predictor variable increases or a relationship in which the value of the response variable decreases as the value of the predictor variable increases. The neural network can be optimized such that a monotonic relationship exists between each predictor variable and the response variable. The monotonicity of these relationships can be determined based on a rate of change of the value of the response variable with respect to each predictor variable.

In some aspects, the monotonicity constraint is enforced using an exploratory data analysis of the training data. For example, if the exploratory data analysis indicates that the relationship between one of the predictor variables and an odds ratio (e.g., an odds index) is positive, and the neural network shows a negative relationship between a predictor variable and a credit score, the neural network can be modified. For example, the predictor variable can be eliminated from the neural network or the architecture of the neural network can be changed (e.g., by adding or removing a node from a hidden layer or increasing or decreasing the number of hidden layers).

Example of Using a Logistic Regression for Predictive Model

In additional or alternative aspects, a model used in a modeling algorithm can be a logistic regression model. A logistic regression model can be generated by determining an appropriate set of logistic regression coefficients that are applied to predictor variables in the model. For example, input attributes in a set of training data are used as the predictor variables. The logistic regression coefficients are used to transform or otherwise map these input attributes into particular outputs in the training data (e.g., predictor data samples and response data samples).

Example of Using a Tree-Based Predictive Model

In additional or alternative aspects, a model used in a modeling algorithm can be a tree-based machine-learning model. For example, the training system 120 can retrieve the objective function from a non-transitory computer-readable medium. The objective function can be stored in the non-transitory computer-readable medium based on, for example, one or more user inputs that define, specify, or otherwise identify the objective function. In some aspects, the training system 120 can retrieve the objective function based on one or more user inputs that identify a particular objective function from a set of objective functions (e.g., by selecting the particular objective function from a menu).

The training system 120 can partition, for each predictor variable in the set X, a corresponding set of the predictor data samples (i.e., predictor variable values). The training system 120 can determine the various partitions that maximize the objective function. The training system 120 can select a partition that results in an overall maximized value of the objective function as compared to each other partition in the set of partitions. The training system 120 can perform a split that results in two child node regions, such as a left-hand region $R_L$ and a right-hand region $R_R$. The training system 120 can determine if a tree-completion criterion has been encountered. Examples of tree-completion criterion include, but are not limited to: the tree is built to a pre-specified number of terminal nodes, or a relative change in the objective function has been achieved. The training system 120 can access one or more tree-completion criteria stored on a non-transitory computer-readable medium and determine whether a current state of the decision tree satisfies the accessed tree-completion criteria. If so, the training system 120 can output the decision tree. Outputting the decision tree can include, for example, storing the decision tree in a non-transitory computer-readable medium, providing the decision tree to one or more other processes, presenting a graphical representation of the decision tree on a display device, or some combination thereof.

Regression and classification trees partition the predictor variable space into disjoint regions, $R_k$ (k=1, ..., K). Each region is assigned a representative response value $\beta_k$. A decision tree T can be specified as:

$$T(x;\Theta) = \Sigma_{k=1}^{K} \beta_k I(x \in R_k), \quad (15)$$

where $\Theta = \{R_k, \beta_k\}_1^K$, $i(.)=1$ if the argument is true and 0 otherwise, and all other variables previously defined. The parameters of Equation (15) are found by maximizing a specified objective function L:

$$\hat{\Theta} = \mathrm{argmax}_\Theta \Sigma_{i=1}^n L(y_i, T(x_i;\Theta)). \quad (16)$$

The estimates, $\hat{R}_k$, of $\hat{\Theta}$ can be computed using a greedy (i.e., choosing the split that maximizes the objective function), top-down recursive partitioning algorithm, after which estimation of $\beta_k$ is superficial (e.g., $\hat{\beta}_k = f(y_i \in \hat{R}_k)$).

A random forest model is generated by building independent trees using bootstrap sampling and a random selection of predictor variables as candidates for splitting each node. The bootstrap sampling involves sampling certain training data (e.g., predictor data samples and response data samples) with replacement, so that the pool of available data samples is the same between different sampling operations. Random forest models are an ensemble of independently built tree-based models. Random forest models can be represented as:

$$F_M(x;\Omega) = q\Sigma_{m=1}^M T_m(x;\Theta_m), \quad (17)$$

where M is the number of independent trees to build, $\Omega = \{\Theta_m\}_1^M$, and q is an aggregation operator or scalar (e.g., $q = M^{-1}$ for regression), with all other variables previously defined.

To create a random forest model, the training system 120 can select or otherwise identify a number M of independent trees to be included in the random forest model. For example, the number M can be stored in a non-transitory computer-readable medium accessible to the training system 120, can be received by the training system 120 as a user input, or some combination thereof. The training system 120 can select, for each tree from 1 . . . M, a respective subset of data samples to be used for building the tree. For example, for a given set of the trees, the training system 120 can execute one or more specified sampling procedures to select the subset of data samples. The selected subset of data samples is a bootstrap sample for that tree.

The training system 120 can execute a tree-building algorithm to generate the tree based on the respective subset of data samples for that tree. For instance, the training system 120 can select, for each split in the tree building process, k out of p predictor variables for use in the splitting process using the specified objective function. The training system 120 can combine the generated decision trees into a random forest model. For example, the training system 120 can generate a random forest model $F_M$ by summing the generated decision trees according to the function $F_M(x; \Omega) = q\Sigma_{m=1}^M T_m(x; \hat{\Theta}_m)$. The training system 120 can output the random forest model. Outputting the random forest model can include, for example, storing the random forest model in a non-transitory computer-readable medium, providing the random forest model to one or more other processes, presenting a graphical representation of the random forest model on a display device, or some combination thereof.

Gradient boosted machine models can also utilize tree-based models. The gradient boosted machine model can be generalized to members of the underlying exponential family of distributions. For example, these models can use a vector of responses, $y = \{y_i\}_1^n$, satisfying $$y = \mu + e, \quad (18)$$

and a differentiable monotonic link function F(.) such that $$F_M(\mu) = \Sigma_{m=1}^M T_m(x;\Theta_m), \quad (19)$$

where, m=1, . . . , M and $\Theta = \{R_k, \beta_k\}_1^M$. Equation (19) can be rewritten in a form more reminiscent of the generalized linear model as $$F_M(\mu) = \Sigma_{m=1}^M X_m \beta_m \quad (20)$$

where, $X_m$ is a design matrix of rank k such that the elements of the $i^{th}$ column of $X_m$ include evaluations of $I(x \in R_k)$ and $\beta_m = \{\beta\}_1^k$. Here, $X_m$ and $\beta_m$ represent the design matrix (basis functions) and corresponding representative response values of the $m^{th}$ tree. Also, e is a vector of unobserved errors with $E(e|\mu) = 0$ and $$\text{cov}(e|\mu) = R_\mu. \quad (21)$$

Here, $R_\mu$ is a diagonal matrix containing evaluations at $\mu$ of a known variance function for the distribution under consideration.

Estimation of the parameters in Equation (19) involves maximization of the objective function $$\hat{\Theta} = \text{argmax}_\Theta \Sigma_{i=1}^n L(y_i, \Sigma_{m=1}^M T_m(x_i;\Theta_m)). \quad (22)$$

In some cases, maximization of Equation (22) is computationally expensive. An alternative to direct maximization of Equation (22) is a greedy stage-wise approach, represented by the following function:

$$\hat{\Theta}_m = \text{argmax}_\Theta \Sigma_{i=1}^n L(y_i, T_m(x_i;\Theta_m) + v). \quad (23)$$

Thus, $$F_m(\mu) = T_m(x;\Theta_m) + v \quad (24)$$

where, $v = \Sigma_{j=1}^{m-1} F_j(\mu) = \Sigma_{j=1}^{m-1} T_j(x; \Theta_j)$.

Methods of estimation for the generalized gradient boosting model at the $m^{th}$ iteration are analogous to estimation in the generalized linear model. Let $\hat{\Theta}_m$ be known estimates of $\Theta_m$ and $\hat{\mu}$ is defined as $$\hat{\mu} = F_m^{-1}[T_m(x;\hat{\Theta}_m) + v]. \quad (25)$$

Letting $$z = F_m(\hat{\mu}) + F'_m(\hat{\mu})(y - \hat{\mu}) - v \quad (26)$$

then, the following equivalent representation can be used:

$$z|\Theta_m \sim N[T_m(x;\Theta_m), F'_m(\hat{\mu})R_{\hat{\mu}}F'_m(\hat{\mu})]. \quad (27)$$

Letting $\Theta_m$ be an unknown parameter, this takes the form of a weighted least squares regression with diagonal weight matrix $$\hat{W} = R_{\hat{\mu}}^{-1}[F'(\hat{\mu})]^{-2}. \quad (28)$$

Table 1 includes examples of various canonical link functions $\hat{W} = R_{\hat{\mu}}$.

TABLE 1

| Distribution | F(μ) | Weight |
|---|---|---|
| Binomial | $\log[\mu/(1-\mu)]$ | $\mu(1-\mu)$ |
| Poisson | $\log(\mu)$ | $\mu$ |
| Gamma | $\mu^{-1}$ | $\mu^{-2}$ |
| Gaussian | $\mu$ | 1 |

The response z is a Taylor series approximation to the linked response F(y) and is analogous to the modified dependent variable used in iteratively reweighted least squares. The objective function to maximize corresponding to the model for z is $$L(\Theta_m, R; z) = \quad (29)$$
$$-\frac{1}{2}\log|\phi V| - \frac{1}{2\phi}(z - T_m(x;\Theta_m))^T V^{-1}(z - T_m(x;\Theta_m)) - \frac{n}{2}\log(2\pi),$$

where, $V = W^{-1/2} R_\mu W^{-1/2}$ and $\phi$ is an additional scale/dispersion parameter. Estimation of the components in Equation (19) are found in a greedy forward stage-wise fashion, fixing the earlier components.

To create a gradient boosted machine model, the training system 120 can identify a number of trees for a gradient boosted machine model and specify a distributional assumption and a suitable monotonic link function for the gradient boosted machine model. The training system 120 can select or otherwise identify a number M of independent trees to be included in the gradient boosted machine model and a differentiable monotonic link function F(.) for the model. For example, the number M and the function F(.) can be stored in a non-transitory computer-readable medium accessible to the training system 120, can be received by the training system 120 as a user input, or some combination thereof.

The training system 120 can compute an estimate of $\mu$, $\hat{\mu}$ from the training data or an adjustment that permits the application of an appropriate link function (e.g. $\hat{\mu}=n^{-1}\Sigma_{i=1}^{n}y_i$), and set $v_0=F_0(\hat{\mu})$, and define $R_{\hat{\mu}}$. The training system 120 can generate each decision tree using an objective function such as a Gaussian log likelihood function (e.g., Equation 15). The training system 120 can regress z to x with a weight matrix $\hat{W}$. This regression can involve estimating the $\Theta_m$ that maximizes the objective function in a greedy manner. The training system 120 can update $v_m = v_{m-1} + T_m(x; \hat{\Theta}_m)$ and setting $\hat{\mu}=F_m^{-1}(v_m)$. The training system 120 can execute this operation for each tree. The training system 120 can output a gradient boosted machine model. Outputting the gradient boosted machine model can include, for example, storing the gradient boosted machine model in a non-transitory computer-readable medium, providing the gradient boosted machine model to one or more other processes, presenting a graphical representation of the gradient boosted machine model on a display device, or some combination thereof.

In some aspects, the tree-based machine-learning model for each time bin is iteratively adjusted to enforce monotonicity with respect to output values associated with the terminal nodes of the decision trees in the model. For instance, the training system 120 can determine whether values in the terminal nodes of a decision tree have a monotonic relationship with respect to one or more predictor variables in the decision tree. In one example of a monotonic relationship, the predicted response increases as the value of a predictor variable increases (or vice versa). If the training system 120 detects an absence of a required monotonic relationship, the training system 120 can modify a splitting rule used to generate the decision tree. For example, a splitting rule may require that data samples with predictor variable values below a certain threshold value are placed into a first partition (i.e., a left-hand side of a split) and that data samples with predictor variable values above the threshold value are placed into a second partition (i.e., a right-hand side of a split). This splitting rule can be modified by changing the threshold value used for partitioning the data samples.

A training system 120 can also train an unconstrained tree-based machine-learning model by smoothing over the representative response values. For example, the training system 120 can determine whether values in the terminal nodes of a decision tree are monotonic. If the training system 120 detects an absence of a required monotonic relationship, the training system 120 can smooth over the representative response values of the decision tree, thus enforcing monotonicity. For example, a decision tree may require that the predicted response increases if the decision tree is read from left to right. If this restriction is violated, the predicted responses can be smoothed (i.e., altered) to enforce monotonicity.

General Considerations

As used in this application, the terms "component," "module," "system" and the like are intended to include a computer-related entity, such as, but not limited to, hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter. The system or systems discussed herein are not limited to any particular hardware architecture or configuration. A computing device can include any suitable arrangement of components that provides a result conditioned on one or more inputs. Suitable computing devices include multipurpose microprocessor-based computing systems accessing stored software that programs or configures the computing system from a general purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Unless specifically stated otherwise, it is appreciated that throughout this specification that terms such as "processing," "computing," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

Aspects of the methods disclosed herein may be performed in the operation of such computing devices. The order of the blocks presented in the examples above can be varied—for example, blocks can be re-ordered, combined, or broken into sub-blocks. Certain blocks or processes can be performed in parallel. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific aspects thereof, it will be appreciated that those skilled in the art, upon attaining an understanding of the foregoing, may readily produce alterations to, variations of, and equivalents to such aspects. Any aspects or examples may be combined with any other aspects or examples. Accordingly, it should be understood that the present disclosure has been presented for purposes of example rather than limitation, and does not preclude inclusion of such modifications, variations, or additions to the present subject matter as would be readily apparent to one of ordinary skill in the art.

The invention claimed is:

1. A system comprising:
   in a secured part of the system:
   a data repository storing data samples having values of variables for input to a machine-learning model for risk assessment for an entity, wherein the variables respectively correspond to actions performed by the entity or observations of the entity,
   an external-facing subsystem configured for preventing a host server system from accessing the data repository via a data network, and
   an evaluation system configured for:
      accessing (a) an estimated dataset having a set of estimated values of an attribute that is a continuous variable, the estimated dataset generated by applying the machine-learning model to an input dataset of the data samples and (b) a validation dataset having a set of validation values of the attribute, the set of validation values respectively being known values corresponding to the set of estimated values generated by the machine-learning model,
      generating, from a comparison of the estimated dataset and the validation dataset to an outcome of interest, a discretized evaluation dataset with data values in multiple categories, wherein generating the discretized evaluation dataset comprises:
         identifying a first category for the discretized evaluation dataset indicating a match between estimated values and validation values with respect to the outcome of interest;
         identifying a second category for the discretized evaluation dataset indicating a mismatch between estimated values and validation values with respect to the outcome of interest;
         determining, from the comparison of the estimated dataset and the validation dataset to the outcome of interest, a number of matches in the first category and a number of mismatches in the second category; and
         outputting the discretized evaluation dataset having the first category with the number of matches and the second category with the number of mismatches,
      computing, for the machine-learning model, an evaluation metric based on a comparison of data values from different categories of the discretized evaluation dataset, the evaluation metric indicating an accuracy of the machine-learning model, and
      providing a host server system with access to one or more of (a) the evaluation metric and (b) a modeling output generated with the machine-learning model; and
   the host server system, wherein the host server system is communicatively coupled to the evaluation system via the external-facing subsystem is configured for modifying a host system operation based on the one or more of (a) the evaluation metric and (b) the modeling output, wherein the modeling output indicates a risk level associated with a target entity described by the input dataset, wherein modifying the host system operation comprises one or more of:
      providing a computing device associated with the target entity with access to a permitted function of an interactive computing environment based on the risk level; and
      preventing the computing device associated with the target entity from accessing a restricted function of the interactive computing environment based on the risk level.

2. The system of claim 1, wherein:
   the outcome of interest comprises the attribute having a value greater than a threshold value,
   the match comprises both a first estimated value and a first validation value being greater than the threshold value, the first validation value corresponding to the first estimated value,
   the mismatch comprises one of a second estimated value and a second validation value being greater than the threshold value and another of the second estimated value and the second validation value being less than the threshold value, the second validation value corresponding to the second estimated value.

3. The system of claim 1, wherein:
   the outcome of interest comprises the attribute having a value less than a threshold value,
   the match comprises both a first estimated value and a first validation value being less than the threshold value, the first validation value corresponding to the first estimated value,
   the mismatch comprises one of a second estimated value and a second validation value being greater than a threshold value and another of the second estimated value and the second validation value being less than the threshold value, the second validation value corresponding to the second estimated value.

4. The system of claim 1, wherein:
   the first category comprises a true positive category and true negative category, and
   the second category comprises a false positive category and false negative category.

5. The system of claim 1, wherein computing the evaluation metric comprises computing a percentage of matches within a sum of the matches in the first category and the mismatches in the second category.

6. The system of claim 1, wherein modifying the host system operation further comprises causing the host server system or a web server to modify a functionality of an online interface provided to a user device associated with the target entity.

7. A method comprising:
   accessing, by a server system, (a) an estimated dataset having a set of estimated values of an attribute that is a continuous variable, the estimated dataset generated by applying a machine-learning model for risk assessment for an entity to an input dataset of data samples and (b) a validation dataset having a set of validation values of the attribute, the set of validation values respectively being known values corresponding to the set of estimated values generated by the machine-learning model;
   generating, by the server system and from a comparison of the estimated dataset and the validation dataset to an outcome of interest, a discretized evaluation dataset with data values in multiple categories; wherein generating the discretized evaluation dataset comprises:

identifying a first category for the discretized evaluation dataset indicating a match between estimated values and validation values with respect to the outcome of interest;
identifying a second category for the discretized evaluation dataset indicating a mismatch between estimated values and validation values with respect to the outcome of interest;
determining, from the comparison of the estimated dataset and the validation dataset to the outcome of interest, a number of matches in the first category and a number of mismatches in the second category; and
outputting the discretized evaluation dataset having the first category with the number of matches and the second category with the number of mismatches,
computing, by the server system and for the machine-learning model, an evaluation metric based on a comparison of data values from different categories of the discretized evaluation dataset, the evaluation metric indicating an accuracy of the machine-learning model; and
providing a host computing system with access to one or more of (a) the evaluation metric and (b) a modeling output generated with the machine-learning model, wherein providing the host computing system with access to the one or more of (a) the evaluation metric and (b) the modeling output causes the host computing system to modify a host system operation, wherein the modeling output indicates a risk level associated with a target entity described by the input dataset, wherein modifying the host system operation comprises one or more of:
providing a computing device associated with the target entity with access to a permitted function of an interactive computing environment based on the risk level; and
preventing the computing device associated with the target entity from accessing a restricted function of the interactive computing environment based on the risk level.

8. The method of claim 7, wherein:
the outcome of interest comprises the attribute having a value greater than a threshold value,
the match comprises both a first estimated value and a first validation value being greater than the threshold value, the first validation value corresponding to the first estimated value,
the mismatch comprises one of a second estimated value and a second validation value being greater than the threshold value and another of the second estimated value and the second validation value being less than the threshold value, the second validation value corresponding to the second estimated value.

9. The method of claim 7, wherein:
the outcome of interest comprises the attribute having a value less than a threshold value,
the match comprises both a first estimated value and a first validation value being less than the threshold value, the first validation value corresponding to the first estimated value,
the mismatch comprises one of a second estimated value and a second validation value being greater than the threshold value and another of the second estimated value and the second validation value being less than the threshold value, the second validation value corresponding to the second estimated value.

10. The method of claim 7, wherein:
the first category comprises a true positive category and true negative category, and
the second category comprises a false positive category and false negative category.

11. The method of claim 10, wherein computing the evaluation metric comprises computing a percentage of matches within a sum of the matches in the first category and the mismatches in the second category.

12. The method of claim 10, wherein modifying the host system operation further comprises
causing the host computing system or a web server to modify a functionality of an online interface provided to a user device associated with the target entity, wherein the modeling output indicates the risk level associated with the target entity.

13. A non-transitory computer-readable medium having program code stored thereon, wherein the program code, when executed by one or more processing devices, configures the one or more processing devices to perform operations comprising:
accessing (a) an estimated dataset having a set of estimated values of an attribute that is a continuous variable, the estimated dataset generated by applying a machine-learning model for risk assessment for an entity to an input dataset of data samples and (b) a validation dataset having a set of validation values of the attribute, the set of validation values being known values respectively corresponding to the set of estimated values generated by the machine-learning model,
generating, from a comparison of the estimated dataset and the validation dataset to an outcome of interest, a discretized evaluation dataset with data values in multiple categories, wherein generating the discretized evaluation dataset comprises:
identifying a first category for the discretized evaluation dataset indicating a match between estimated values and validation values with respect to the outcome of interest;
identifying a second category for the discretized evaluation dataset indicating a mismatch between estimated values and validation values with respect to the outcome of interest;
determining, from the comparison of the estimated dataset and the validation dataset to the outcome of interest, a number of matches in the first category and a number of mismatches in the second category; and
outputting the discretized evaluation dataset having the first category with the number of matches and the second category with the number of mismatches,
computing, for the machine-learning model, an evaluation metric based on a comparison of data values from different categories of the discretized evaluation dataset, the evaluation metric indicating an accuracy of the machine-learning model, and
providing a host computing system with access to one or more of (a) the evaluation metric and (b) a modeling output generated with the machine-learning model, wherein the one or more of (a) the evaluation metric and (b) the modeling output is usable by the host computing system for modifying a host system operation, wherein the modeling output indicates a risk level associated with a target entity described by the input dataset, wherein modifying the host system operation comprises one or more of:

providing a computing device associated with the target entity with access to a permitted function of an interactive computing environment based on the risk level; and preventing the computing device associated with the target entity from accessing a restricted function of the interactive computing environment based on the risk level.

14. The non-transitory computer-readable medium of claim 13, wherein:

the first category comprises a true positive category and true negative category, the second category comprises a false positive category and false negative category, and computing the evaluation metric comprises computing a percentage of matches within a sum of the matches in the first category and the mismatches in the second category.

15. The non-transitory computer-readable medium of claim 13, wherein modifying the host system operation further comprises causing the host computing system or a web server to modify a functionality of an online interface provided to a user device associated with the target entity, wherein the modeling output indicates the risk level associated with the target entity.

* * * * *